(12) United States Patent
van Rees

(10) Patent No.: US 11,433,592 B2
(45) Date of Patent: Sep. 6, 2022

(54) METHOD OF FORMING A LINEAR PANEL FROM MULTI-LAYER PANEL MATERIAL ASSEMBLIES

(71) Applicant: Hunter Douglas Industries B.V., Rotterdam (NL)

(72) Inventor: Pieter van Rees, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 275 days.

(21) Appl. No.: 16/564,151

(22) Filed: Sep. 9, 2019

(65) Prior Publication Data

US 2020/0079003 A1 Mar. 12, 2020

Related U.S. Application Data

(60) Provisional application No. 62/730,265, filed on Sep. 12, 2018.

(51) Int. Cl.
*B29C 53/04* (2006.01)
*B32B 37/04* (2006.01)
(Continued)

(52) U.S. Cl.
CPC ............ *B29C 53/043* (2013.01); *B29C 70/52* (2013.01); *B29D 99/001* (2013.01); *B29D 99/0003* (2013.01); *B32B 37/04* (2013.01); *B32B 37/20* (2013.01); *B29K 2101/12* (2013.01); *B29L 2031/003* (2013.01); *B32B 2307/102* (2013.01); *B32B 2607/00* (2013.01)

(58) Field of Classification Search
CPC ... B29C 70/528; B29C 53/043; B29C 63/044; B29C 63/04; B29C 69/007; B32B 37/04
See application file for complete search history.

(56) References Cited

U.S. PATENT DOCUMENTS

| | | | |
|---|---|---|---|
| 4,151,031 A | 4/1979 | Goad et al. | |
| 4,272,937 A | 6/1981 | Brugman | |

(Continued)

FOREIGN PATENT DOCUMENTS

| | | |
|---|---|---|
| AT | 375994 | 9/1984 |
| CN | 103465572 A | 12/2013 |

(Continued)

OTHER PUBLICATIONS

Chinese Search Report issued in CN Application No. 2017800432223, dated Jul. 30, 2020 (2 pages).

(Continued)

*Primary Examiner* — Benjamin A Schiffman
(74) *Attorney, Agent, or Firm* — Dority & Manning, P.A.

(57) ABSTRACT

In one aspect of the present subject matter, a method of forming a linear panel includes drawing a multi-layer panel material assembly having differing inner and outer material layers along a processing path. The method also includes heating the panel material assembly. In addition, the method includes forming the heated panel material assembly into a desired shape as the assembly is drawn along the processing path. Additionally, in another aspect of the present subject matter, a linear panel includes a body formed from a multi-layer panel material assembly having differing inner and outer material layers.

17 Claims, 10 Drawing Sheets

(51) Int. Cl.
  *B29C 70/52* (2006.01)
  *B29D 99/00* (2010.01)
  *B32B 37/20* (2006.01)
  *B29K 101/12* (2006.01)
  *B29L 31/00* (2006.01)

(56) References Cited

U.S. PATENT DOCUMENTS

| | | | |
|---|---|---|---|
| 5,124,196 A * | 6/1992 | Figge, Sr. | B29C 37/0082 |
| | | | 428/408 |
| 5,891,379 A | 4/1999 | Bhattacharyya | |
| 5,981,411 A | 11/1999 | Brown | |
| 8,758,563 B2 | 6/2014 | Jaffee et al. | |
| 2002/0137421 A1 | 9/2002 | Desroches et al. | |
| 2010/0066121 A1 | 3/2010 | Gross | |
| 2011/0266088 A1 | 11/2011 | Koike et al. | |
| 2013/0134621 A1* | 5/2013 | Tsotsis | B29C 48/90 |
| | | | 264/177.2 |
| 2013/0136877 A1 | 5/2013 | Nelson et al. | |
| 2014/0030491 A1 | 1/2014 | Sakai et al. | |
| 2014/0147641 A1 | 5/2014 | Vermeulen | |
| 2018/0009155 A1 | 1/2018 | Langeveld et al. | |
| 2018/0245344 A1 | 8/2018 | Venjen-Jensen et al. | |
| 2018/0339491 A1 | 11/2018 | Hursit et al. | |

FOREIGN PATENT DOCUMENTS

| | | |
|---|---|---|
| DE | 1918152 A1 | 10/1970 |
| DE | 2409709 A1 | 9/1975 |
| DE | 2559077 | 7/1977 |
| DE | 2815970 | 10/1979 |
| EP | 0049434 | 4/1982 |
| EP | 2599604 | 6/2013 |
| EP | 3543034 | 9/2019 |
| FR | 2535762 | 5/1984 |
| GB | 2174433 A | 11/1986 |
| GB | 2275939 A | 9/1994 |
| KR | 101522109 | 5/2015 |
| WO | WO 9624479 | 8/1996 |
| WO | WO 9704184 | 2/1997 |
| WO | WO 2005105413 | 11/2005 |
| WO | WO 2011011021 | 1/2011 |

OTHER PUBLICATIONS

EP Search Report issued in corresponding Application No. 19196758.7, dated Jan. 30, 2020, (12 pages).

European Search Report issued in corresponding EP Application No. 19196758.7 dated Dec. 21, 2021 (8 pages).

* cited by examiner

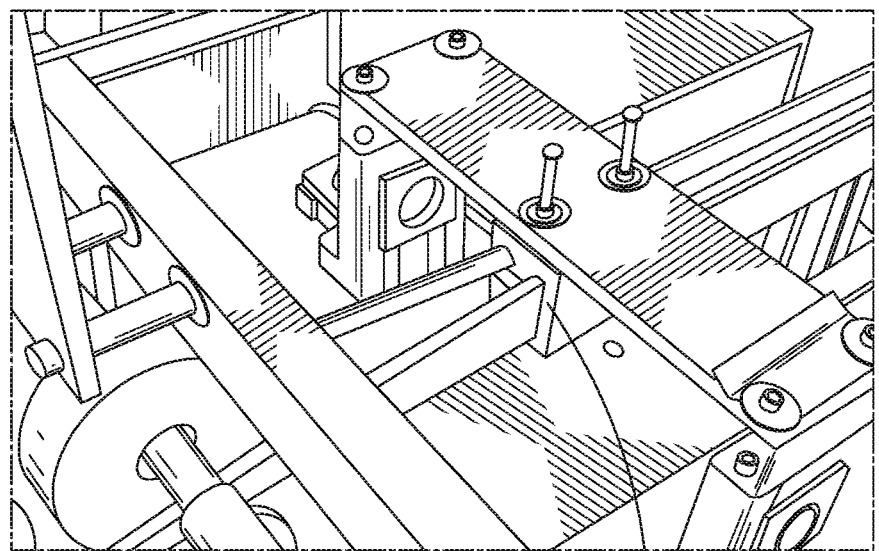
FIG. 15    330
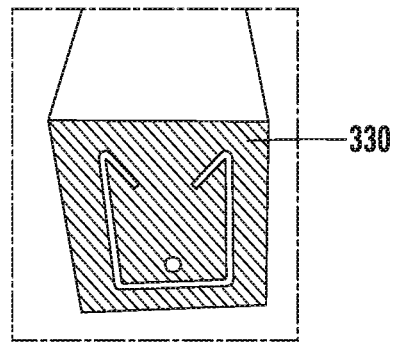
FIG. 16
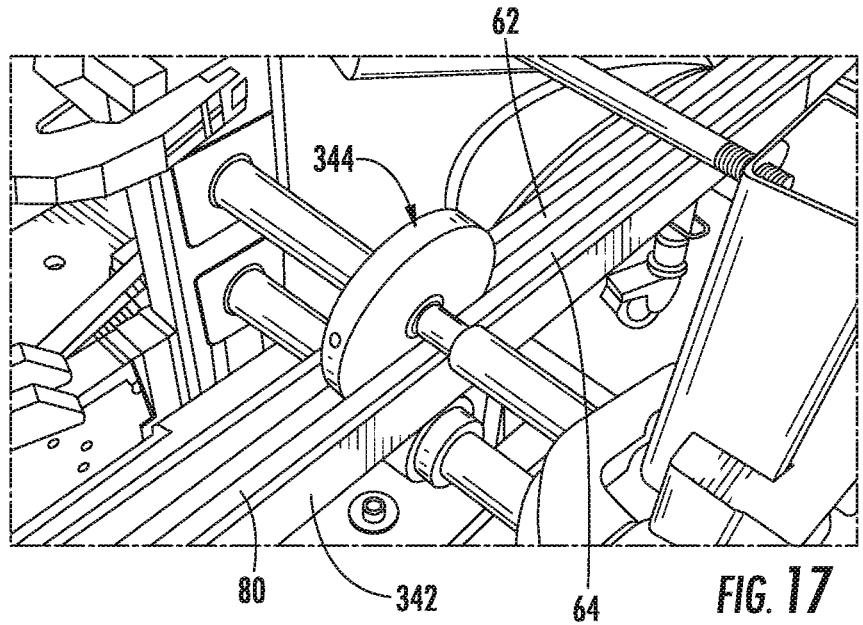
FIG. 17

METHOD OF FORMING A LINEAR PANEL FROM MULTI-LAYER PANEL MATERIAL ASSEMBLIES

CROSS-REFERENCE TO RELATED APPLICATIONS

The present application is based upon and claims the right of priority to U.S. Provisional Patent Application No. 62/730,265, filed Sep. 12, 2018, the disclosure of which is hereby incorporated by reference herein in its entirety for all purposes.

FIELD

The present subject matter relates generally to the manufacture of linear panels, and, in particular, to methods for manufacturing linear panels formed from multi-layer panel material assemblies having differing inner and outer material layers.

BACKGROUND

Linear panels formed from metals, such as aluminum, are known in the art. Linear panels have a length which is substantially greater than their width, the length generally being at least twice the width of the panel and typically five or more times the width of the panel.

Linear panels formed from a metal have the advantage of being relatively light and flame-retardant. However, such panels do not generally exhibit favorable acoustic characteristics. It will be appreciated that, in many circumstances, it might be desirable to provide a ceiling or wall having good sound-absorbing properties. Such a need might be addressed by the provision of non-metallic or only partially metallic panels. However, improved techniques are needed for manufacturing such panels.

Accordingly, improved methods for manufacturing non-metallic or only partially metallic panels, such as panels formed at least partially from fibrous materials, that provide one or more enhanced or desired properties as compared to conventional metallic panels would be welcomed in the technology.

BRIEF DESCRIPTION

Aspects and advantages of the present subject matter will be set forth in part in the following description, or may be obvious from the description, or may be learned through practice of the present subject matter.

In general, the present subject matter is directed to methods of manufacturing linear panels via an in-line process in which each panel is formed, at least in part, by an assembly of material layers. Specifically, in several embodiments, each panel is formed from a multi-layer panel material assembly including an inner material layer and an outer material layer, with the inner material layer differing from the outer material layer. In one embodiment, both the inner and outer material layers are formed from non-metallic materials (e.g., fibrous materials).

In one embodiment, the method includes drawing a multi-layer panel material assembly including differing inner and outer material layers along a processing path. In one embodiment, the method also includes heating the panel material assembly. Additionally, in one embodiment, the method includes forming the heated panel material assembly into a desired shape as the assembly is drawn along the processing path.

Moreover, in one embodiment, the present subject matter is directed to a linear panel formed from a multi-layer panel material assembly including differing inner and outer material layers. For example, in one embodiment, the inner material layer is formed from a material having a forming temperature that is less than a forming temperature of a material used to form the outer material layer.

These and other features, aspects and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 15 illustrates a perspective view of one embodiment of a portion of a mold that may be utilized in accordance with aspects of the present subject matter when forming one embodiment of the disclosed panel;

FIG. 16 illustrates an end view of the mold shown in FIG. 15; and

FIG. 17 illustrates a perspective view of one embodiment of a cooling stage that may be utilized in accordance with aspects of the present subject matter for cooling panel materials.

DETAILED DESCRIPTION

Figure 1:
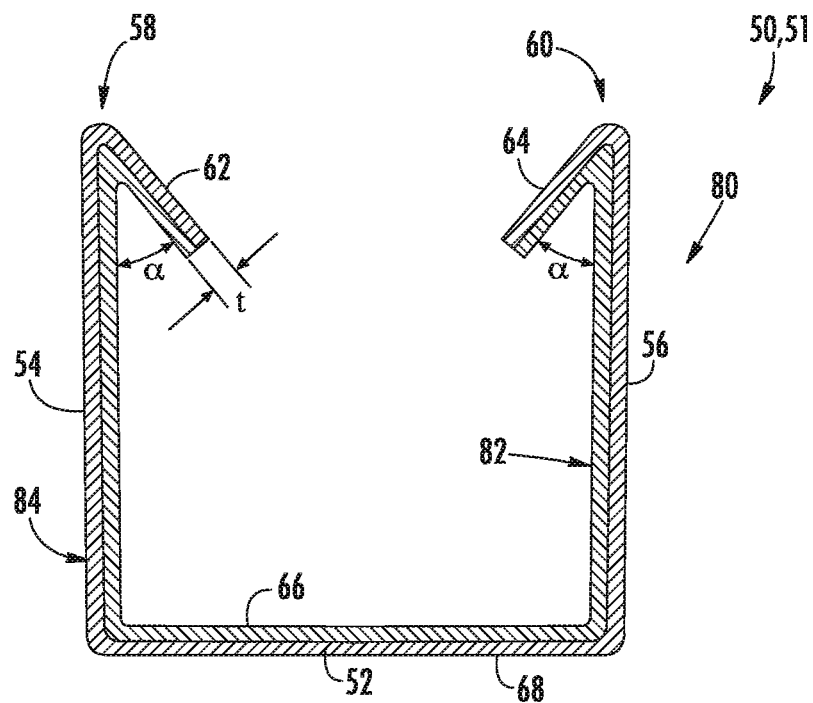
FIG. 1 illustrates a cross-sectional view of one embodiment of a panel manufactured in accordance with aspects of the present subject matter.

In general, the present subject matter is directed to methods for manufacturing panels from a multi-layer panel material assembly. Specifically, in several embodiments, the multi-layer panel material assembly includes two or more material layers, such as an inner material layer and an outer material layer. In one embodiment, the inner and outer material layers differ from each other, such as by being formed from differing materials and/or by having differing material properties (e.g., differing forming and/or melting temperatures).

By configuring the panel manufactured in accordance with aspects of the present subject matter as a multi-layer assembly of materials, the separate material layers may be configured to perform or provide separate functions. For instance, in one embodiment, the outer material layer is configured to provide one or more non-structural properties or qualities for the panel while the inner material layer is configured to provide one or more structural properties for the panel, such as by configuring the outer material layer to serve as the primary decorative layer of the panel while configuring the inner material layer to serve as the primary structural or shape-holding layer of the panel. Such division of the panel functions into separate material layers may, in many instances, allow for a more cost-effective panel to be produced without sacrificing performance or desired characteristics. In addition to aesthetic or decorative qualities (or as an alternative thereto), the outer material layer may also provide one or more non-structural functional characteristics to the panel, such as sound-absorbing characteristics and/or flame-retardant qualities. Similarly, in addition to any structural characteristics, the inner material layer may also provide one or more non-structural functional characteristics to the panel, such as sound-absorbing characteristics and/or flame-retardant qualities.

In one embodiment, the inner material layer of the panel material assembly is formed from a material(s) that has a forming/melting temperature that is less than a respective forming/melting temperature of the material used to form the outer material layer of the panel material assembly. In such an embodiment, the processing temperatures used within the disclosed processes may, for example, be selected to be equal to or greater than the forming/melting temperature of the inner material layer, but less than the forming/melting temperature of the outer material layer. As a result, during the manufacturing process, the material of the inner material layer may be heated to a temperature at or above its forming and/or melting temperature to allow for desired processing of the panel material assembly, such as when adhering the inner and outer material layers to each other to form the panel material assembly and/or when shaping the panel material assembly into the desired panel shape, while maintaining the desired properties of the outer material layer due to the processing temperature being lower than its associated forming/melting temperature.

In several embodiments, the outer material layer of the panel material assembly is formed from a material having one or more desired properties, such as a material having an aesthetically pleasing look or a material being acoustically open and/or sound-absorbing. Specifically, in one embodiment, the outer material layer is formed from a fibrous material, such as a non-woven felt material or a woven fibrous material. For example, in one embodiment, the outer material layer comprises a fibrous material formed from synthetic fibers, such as polyester fibers (PES), polyethylene terephthalate (PET) fibers, and/or any other suitable synthetic fiber(s) and/or combinations thereof, or natural fibers, such as wool or any other suitable natural fibers. As indicated above, in one embodiment, the material(s) selected for the outer material layer has a forming/melting temperature that is higher than the processing temperature(s) used during the panel-forming process. As such, when the outer material layer is formed from a felt material, the higher melting temperature will prevent the fibers of the outer material layer from melting, thereby maintaining the decorative qualities of the layer (e.g., the felt-like appearance/texture) and/or the desired functional qualities of the layer (e.g., desired sound-absorbing qualities and/or flame-retardant qualities).

Additionally, in several embodiments, the inner material layer is formed from a thermoformable material that allows it to become flexible or formable at the processing temperature(s) used during the panel-forming process and then hold its shape once the material is subsequently cooled down. Additionally, in one embodiment, the inner material layer is formed from a thermoformable material that also exhibits one or more desired non-structural properties (e.g., by being acoustically open and/or sound-absorbing and/or by having desired flame-retardant qualities), such as any suitable thermoformable fibrous material (e.g., woven and non-woven materials formed at least in part by synthetic fibers, including bi-component fibers) or any suitable thermoformable film material (e.g., polymer films, such as perforated polymer films). Suitable bi-component fibers may, for example, fibers having an inner core formed from a first synthetic material having a first melting temperature and an outer layer or sheath formed from a second synthetic material. As indicated above, in one embodiment, the material(s) selected for the inner material layer has a forming and/or melting temperature that is equal or less than the processing temperature(s) used during the panel-forming process. As such, during processing, the inner material layer may be heated to allow the panel material assembly to be shaped or formed, as desired, and/or to allow the outer material layer to be adhered to the inner material layer.

In one aspect, a method of forming a linear panel is disclosed that utilizes an in-line processing arrangement in which a panel material assembly is drawn through a sequence of processing equipment during which a corresponding sequence of operations or processing steps is performed to manufacture a desired panel. For example, in one embodiment, the method includes drawing the panel material assembly along a processing path, with the panel material assembly including an inner material layer and an outer material layer that differs from the inner material layer. The method also includes heating the panel material assembly as the panel material assembly is drawn along the processing path and forming the heated panel material assembly into a desired panel shape. In addition, the method includes cooling the panel material assembly after it has been formed into the desired panel shape and as the panel material assembly is drawn along the processing path.

In one embodiment, the sequence of process equipment and the corresponding sequence of operations or processing steps performed on the panel material assembly corresponds to a continuous sequence of equipment/operations, such as when the panel material assembly is continuously drawn through various processing stations positioned one after the other along the processing path. Alternatively, the sequence of process equipment and the corresponding sequence of operations or processing steps performed on the panel material assembly may correspond to a non-continuous or interrupted sequence of equipment/operations.

In one embodiment, the method also includes forming the panel material assembly as part of the in-line process while a downstream portion of the panel material assembly is being drawn along the processing path. For instance, in one embodiment, the method includes coupling separate strips, webs, pieces, or lengths of material (referred to herein simply as "strips" of material for the sake of convenience and without intent to limit) together to form the panel material assembly. Specifically, in one embodiment, the method includes coupling an inner strip of material to an outer strip of material to form the inner and outer material layers, respectively, of the panel material assembly. Additionally, in one embodiment, the method includes heating the inner strip of material to facilitate adherence of the inner strip of material to the outer strip of material. For example, in one embodiment, the inner strip of material is heated to a processing temperature that is equal to or greater than a melting temperature of the material forming the inner material strip to facilitate adherence of the inner and outer strips of material. Moreover, in one embodiment, the method includes pressing the inner and outer strips of material together to facilitate adherence of the inner strip of material to the outer strip of material.

In one embodiment, the panel material assembly further includes an intermediate layer disposed between the inner and outer material layers. In such an embodiment, the panel material is formed, for example, by heating the intermediate layer to a processing temperature (e.g., an activation temperature of the intermediate layer) to facilitate adherence of the inner strip of material to the outer strip of material.

In one embodiment, the outer material layer is formed from a fibrous material. For instance, in one embodiment, the outer material layer is formed from a non-woven or woven fibrous material formed at least partially from synthetic fibers, such as at least one of polyester fibers or polyethylene terephthalate fiber, or natural fibers (e.g., wool). In one embodiment, the outer material layer is formed from two different types of fibers (e.g., two different synthetic and/or natural fibers) and/or comprises bi-component polyester fibers.

In one embodiment, the inner material layer is formed from a thermoformable material. For instance, in one embodiment, the inner material layer is formed from a thermoformable fibrous material, such as a woven or non-woven material formed at least partially from synthetic fibers. In one embodiment, the inner material layer is formed from two different types of synthetic fibers and/or comprises bi-component polyester fibers. In another embodiment, the inner material layer is formed from a thermoformable film material, such as a perforated polymer film material. In an embodiment in which one or both of the material layers are formed from synthetic fibers, the fibers may have flame-retardant properties.

In one embodiment, the method includes drawing the panel material assembly through a heating station to heat the material assembly. In such an embodiment, the heating station may include a single heating unit or device or multiple heating units or devices for heating the material. For instance, in a particular embodiment, the heating station includes at least one of a pre-heating unit, a heated mold, a thermo-forming unit, and/or any other suitable heating device. Additionally, in embodiments in which the heating station includes two or more heating devices, the heating station may be formed as a continuous station (e.g., with the heating devices placed back-to-back along the processing direction of the panel material assembly), or the heating devices may be spaced apart from one another along the processing direction of the panel material assembly.

In one embodiment, the method includes heating the panel material assembly to a processing temperature as the panel material assembly is drawn along the processing path. In one embodiment, the processing temperature is greater than a forming temperature of the inner material layer and less than a forming temperature of the outer material layer.

In one embodiment, the method includes drawing the panel material assembly through a plurality or series of form blocks of the heated mold. In such an embodiment, each form block includes a different cut-out shape such that, when the panel material assembly through the heated mold, the panel material assembly passes through each of the plurality of form blocks to incrementally change a shape of the panel material assembly.

In one embodiment, the method includes drawing the panel material assembly through a cooling station. For instance, in one embodiment, the method includes drawing the panel material assembly through a plurality of form blocks of the cooling station as a flow of air is directed towards the panel material assembly.

In one embodiment, the method includes cutting the panel material assembly into linear panel lengths. For instance, in one embodiment, the panel material assembly is cut to length after the panel material assembly has been formed and cooled.

In one embodiment, the panel material assembly is able to be formed into a desired shape within a given temperature range selected based on the material properties of the inner material layer. For instance, in one embodiment, the panel material assembly is able to be permanently formed into the desired shape at a temperature that is at or greater than the forming/melting temperature of the inner material layer. However, in doing so, it is also desirable, in several embodiments, to select a processing temperature that is less than the forming/melting temperature of the outer material layer. For instance, when the outer material layer is formed from a felt material including synthetic fibers, the processing temperature(s) can be selected to be less than the forming/melting temperature of the fibers to ensure that the outer surface or exterior of the panel formed by the outer material layer retains a fibrous, felt-like appearance. This is advantageous where the panel is desired to have good sound absorbency, and may also be more aesthetically desirable. If the panel material assembly was, instead, heated to a temperature such that most or all of the fibers melted and fused together, the resulting panel would have a smooth outer surface, and a greater density. Although this increases the strength of the material, it may reduce its ability to dampen sound and may also impact the overall desired look or decorative qualities of the panel.

In another aspect, the present subject matter is directed to a method of forming a linear panel using an in-line processing arrangement in which a layered material assembly is formed and drawn through a sequence of processing equipment during which a corresponding sequence of operations or processing steps is performed to manufacture a desired panel. The method includes coupling separate strips of material together to form the layered material assembly including an inner material layer and an outer material layer as a downstream portion of the layered material assembly is being drawn along a processing path, with the inner material layer differing from the outer material layer. In addition, the method also includes heating the layered material assembly as the layered material assembly is drawn along the processing path, and forming the heated layered material assembly into a desired panel shape.

In one embodiment, the sequence of process equipment and the corresponding sequence of operations or processing steps performed corresponds to a continuous sequence of equipment/operations, such as when the panel material assembly is continuously drawn through various processing stations positioned one after the other along the processing path. Alternatively, the sequence of process equipment and the corresponding sequence of operations or processing steps performed on the panel material assembly may correspond to a non-continuous or interrupted sequence of equipment/operations.

In one embodiment, the separate strips of material comprise an inner strip of material and an outer strip of material, with the inner strip of material forming the inner material layer of the panel material assembly and the outer strip of material forming the outer material layer of the panel material assembly. Additionally, in one embodiment, the method includes heating the inner strip of material to facilitate adherence of the inner strip of material to the outer strip of material, such as by heating the inner strip of material to a processing temperature that is equal to or greater than a melting temperature of the material forming the inner material strip. Moreover, in one embodiment, the method includes pressing the inner and outer strips of material together to facilitate adherence of the inner strip of material to the outer strip of material.

It should be appreciated that, in several embodiments, the various processing steps of the disclosed methods, including, but not limited to, heating the material, forming the material, and cooling the material, may be performed in a variety of different ways and/or using any combination of suitable manufacturing equipment, devices, and/or componentry. For instance, aspects of the various example methods described herein may be combined or interchanged with other aspects to vary the manufacturing method used to form a given panel.

It should be also appreciated that the disclosed methods allows for panels to be manufactured that exhibit enhanced or improved properties over conventional metallic panels. For instance, the panels formed using the disclosed methods may have various desired decorative qualities while also exhibiting sufficient strength and/or rigidity to allow the panels to be used in any number of different applications, including use as ceiling panels or wall panels and/or in other suitable applications for linear panels. Moreover, the disclosed method further allows for the resulting panels to have various other non-structural functional qualities, such as improved sound-absorbency and/or desired flame-retardant properties.

Additionally, it should be appreciated that the present subject matter is also directed to linear panels manufactured or formed in accordance with one or more aspects of the methods described herein. For example, in one embodiment, a linear panel manufactured in accordance with one or more of the disclosed methods includes a panel body formed from a multi-layer panel assembly having an inner material layer and an outer material layer, with the inner material layer defining an outer surface of the body and the outer material layer defining an outer surface of the body. In one embodiment, the body includes a panel wall and first and second sidewalls extending outwardly from the panel wall. Additionally, in one embodiment, each of the first and second sidewalls is bent at an edge portion of the body to form respective first and second flanges. Moreover, in one embodiment, the inner material layer of the body is formed from a material having a forming temperature that is less than a forming temperature of a material used to form the outer material layer of the body.

Moreover, it should be appreciated that, although the various manufacturing processes disclosed herein will generally be described as being performed in a particular order for purposes of illustration and discussion, the processes are not limited to any particular order or arrangement. One skilled in the art, using the disclosures provided herein, will appreciate that various process steps disclosed herein can be omitted, rearranged, combined, and/or adapted in various ways without deviating from the scope of the present disclosure.

Figure 2:
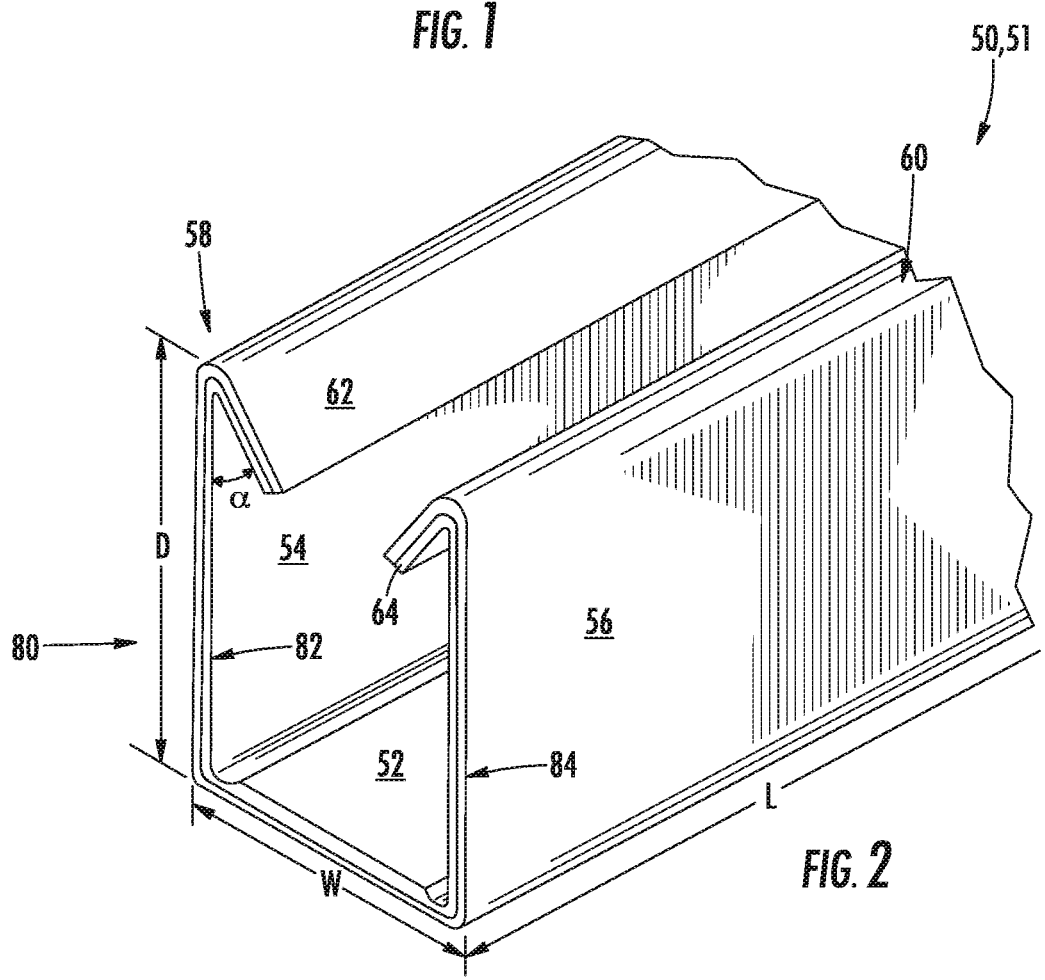
FIG. 2 illustrates a perspective view of the panel shown in FIG. 2.

Referring now to the drawings, FIGS. 1 and 2 illustrate example views of one embodiment of a panel 50 manufactured or made in accordance with aspects of the present subject matter, particularly illustrating both a cross-sectional view of the panel 50 (FIG. 1) and a perspective view of the panel 50 (FIG. 2). As shown, the panel 50 generally has a substantially "U"-shaped cross-section, and is formed by a panel body 51 including a central panel wall 52 and first and second side walls 54, 56 extending outwardly from the central panel wall 52, with each of the first and second sidewalls 54, 56 being bent at corresponding edge portions 58, 60 of the sidewalls 54, 56 to form respective first and second flanges 62, 64. As particularly shown in FIG. 2, the panel body 51 (and thus, the panel 50) has a length L, with the length L being substantially greater than a width W or depth D of the panel 50. Additionally, in one embodiment, the flanges 62, 64 of the panel 50 are configured to be received into and retained by complementary-shaped recesses in a panel carrier (not shown) to enable mounting of the panels on, for example, a ceiling or a wall.

In several embodiments, the body 51 of the panel 50 is configured as or includes a multi-layer panel material assembly 80, with two or more material layers being assembled together to form the panel 50. Specifically, as shown in the illustrated embodiment, the panel material assembly 80 forming the panel 50 includes both an inner material layer 82 and an outer material layer 84. As shown in FIG. 1, the inner material layer 82 is positioned along the interior of the panel 50 and generally defines an inner surface 66 of the panel 50. Similarly, the outer material layer 84 is positioned along the exterior of the panel 50 and generally defines an outer surface 68 of the panel 50. By configuring the panel 50 as a multi-layer assembly of materials, the separate material layers 82, 84 may be configured to perform or provide separate functions, such as by configuring the outer material layer 84 to provide the panel 50 with one or more desired non-structural characteristics or qualities while configuring the inner material layer 82 to provide the panel 50 with one or more desired structural characteristics or qualities. For instance, in one embodiment, the outer material layer 84 may be configured as the primary decorative layer of the panel 50 while the inner material layer 82 may be configured as the primary structural or shape-holding layer of the panel 50. Such division of the panel functions into separate material layers may, in many instances, allow for a more cost-effective panel to be produced without sacrificing performance or desired characteristics. For instance, the material properties of each of the separate material layers 82, 84 may be individually selected to provide desired performance or characteristics associated with the intended function(s) of each layer. It should be appreciated that, in addition to any decorative qualities (or as an alternative thereto), the outer material layer 84 may also provide one or more non-structural functional characteristics or qualities, such as sound-absorbing and/or flame-retardant qualities. Similarly, it should be appreciated that, in addition to any structural qualities, the inner material layer 82 may also provide one or more non-structural functional characteristics or qualities, such as sound-absorbing and/or flame-retardant qualities.

In several embodiments, the outer material layer 84 is formed from a fibrous material having one or more desired properties, such as a fibrous material providing the panel with a desire façade or outward facing look and/or a fibrous material that is acoustically open and/or sound-absorbing. Specifically, in one embodiment, the outer material layer 84 is formed from a non-woven or woven fibrous material, such as a felt material. For example, the outer material layer 84 may comprise a non-woven or woven fibrous material formed from synthetic fibers, such as polyester fibers (PES), polyethylene terephthalate (PET) fibers, and/or any other suitable synthetic fiber(s) and/or combinations thereof, or from natural fibers, such as wool and/or any other suitable fibers. Additionally, in several embodiments, the material properties of the outer material layer 84 may be selected to allow for the panel 50 to be manufactured in accordance with aspects of the panel-forming process described herein. For instance, as will be described below, the outer material layer 84 may have a melting and/or forming temperature that is higher than the processing temperature(s) used during the panel-forming process, thereby allowing the outer material layer 84 to maintain one or more of its desired properties or characteristics, such as its outer texture and/or aesthetic appearance. For example, when the outer material layer 84 is formed from a felt material, the higher melting temperature will prevent the fibers of the outer material layer 84 from melting, thereby maintaining the desired felt-like appearance/texture while also maintaining any desired sound-absorbing qualities of the outer material layer 84. In addition, the material properties of the outer material layer 84 may be selected such that, despite having a melting/forming temperature that is greater than the processing temperature(s) used during the panel-forming process, the outer material layer 84 will still be flexible enough at such processing temperature(s) to allow the layer 84 to follow the shape of the inner material layer 82 as it is being formed into the desired panel shape.

It should be appreciated that, as an alternative to a non-woven or woven fibrous material, the outer material layer 84 may, in other embodiments, be formed from any other suitable material that allows such layer 84 to provide the desired performance and/or characteristics around the exterior of the panel 50, such as any desirable aesthetic properties and/or any desired non-structural functional characteristics.

Additionally, in several embodiments, the inner material layer 82 may be formed from any suitable thermoformable material that allows it to become flexible or formable at the processing temperature(s) used during the panel-forming process, and then to hold its shape once the material is subsequently cooled down. Additionally, in a particular embodiment, the inner material layer 82 may be formed from a thermoformable material that also exhibits one or more desired non-structural properties (e.g., by being acoustically open and/or sound-absorbing and/or by exhibiting flame-retardant qualities), such as any suitable thermoformable fibrous material or any suitable thermoformable film material. For instance, suitable thermoformable fibrous materials may include, but are not limited to, non-woven fibrous materials (e.g., felt materials) and woven fibrous materials. In such an embodiment, the non-woven and/or woven fibrous materials may be formed, at least in part, from synthetic fibers, such as polyester fibers (PES), polyethylene terephthalate (PET) fibers, and/or any other suitable synthetic fiber(s) and/or combinations thereof. Similarly, suitable thermoformable film materials may include, but are not limited to, polymer or plastic films. In such an embodiment, it may be desirable for the film to be configured as a perforated or sound-penetrating film, such as a perforated polymer film.

It should be appreciated that, similar to the outer material layer 84, the material properties of the inner material layer 82 may be selected to allow for the panel 50 to be manufactured in accordance with aspects of the panel-forming process described herein. For instance, given its intended function, the inner material layer 82 may have a melting and/or forming temperature that is equal to or less than the processing temperature(s) used during the panel-forming process (and, thus, less than the melting and/or forming temperature of the outer material layer 84), thereby allowing the inner material layer 82 to be shaped or formed as desired. Additionally, as will be described below, by heating the inner material layer 82 to a processing temperature at or above its melting temperature, the surface of the inner material layer 82 may become "sticky" or tacky, thereby allowing the inner and outer material layers 82, 84 to be coupled or adhered to each other during formation of the panel material assembly 80 as part of the disclosed panel manufacturing process.

It should also be appreciated that, when the inner material layer 82 is formed from a non-woven fibrous material, the fibers may, in certain embodiments, correspond to bi-component synthetic fibers, such as bi-component polyester fibers. In such embodiments, each fiber may include an inner core formed from a first synthetic material (e.g., a first polyester material) having a first melting temperature and an outer layer or sheath formed from a second synthetic material (e.g., a second polyester material) having a second, lower melting temperature, thereby allowing the outer layer or sheath of each bi-component fiber to be melted without melting the inner core. For instance, the first melting temperature may be greater than the processing temperature(s) used during the panel-forming process while the second melting temperature may be less than such processing temperature(s). As a result, the sheath will be melted during processing to allow the inner material layer 82 to be shaped or formed as desired.

As particularly shown in FIG. 1, the panel 50 generally defines an overall thickness (t). In one embodiment, the thickness of the outer material layer 84 is less than the thickness of the inner material layer 82 such that the inner material layer defines a majority of thickness (t) of the panel 50. For instance, in one embodiment, a thickness ratio of the inner material layer 82 to the thickness of the outer material layer 84 may be greater than 1:1 in increments of 0.05. In another embodiment, the thickness ratio of the inner material layer 82 to the thickness of the outer material layer 84 may be less than 4:1 in increments of 0.05. In yet another embodiment, the thickness ratio of the inner material layer 82 to the thickness of the outer material layer 84 may correspond to any thickness ratio within a range of ratios between 1:1 and 4:1 in increments of 0.05. For example, in a particular embodiment, the thickness ratio of the inner material layer 82 to the thickness of the outer material layer 84 may be 1.5:1 or 2:1 or 2.5:1.

It should be appreciated that, by configuring the disclosed panel 50 to include two separate material layers, the inner and outer material layers 82, 84 may be formed from different materials, thereby allowing specific materials to be selected to achieve the desired panel properties while reducing material costs. For example, in embodiments in which the inner material layer 82 is configured to serve as the primary structural layer of the panel 50 and does not generally contribute to the aesthetic qualities of the panel 50, such layer 82 may be formed from a less expensive material that still provides the desired structural qualities. In contrast, given that the outer material layer 84 generally defines the outward facing surface of the panel 50 and, thus, contributes to the overall look and feel of the panel 50, such layer 84 may be formed from a more expensive material. Accordingly, by using a dual-layer configuration, less of the outer, more expensive material is needed to form the panel 50 (e.g., as opposed to forming the panel 50 entirely from the more expensive material in an attempt to achieve the desired structural and decorative qualities).

It should be appreciated that the specific configuration of the panel 50 described above and shown in FIGS. 1 and 2 is provided only as an example of a suitable panel configuration that may be formed using the disclosed panel manufacturing process. However, in general, those of ordinary skill in the art should appreciate that panels formed in accordance with the methods and processes described herein may have various other shapes, dimensional configurations, and/or the like, depending, for instance, on the intended application and/or use of the panels being formed.

Figure 3:
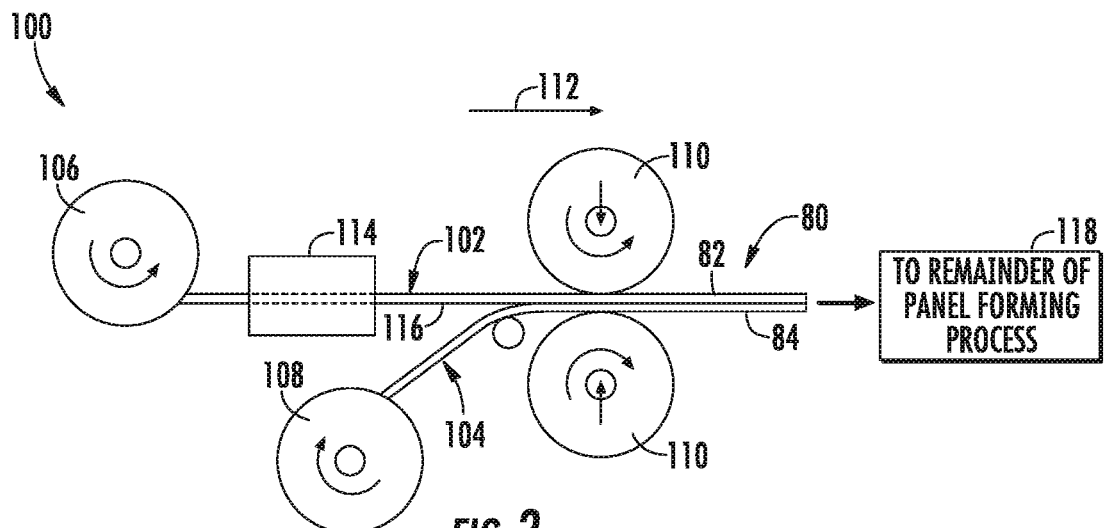
FIG. 3 illustrates a schematic view of one embodiment of a process and related processing equipment for forming a multi-layer panel material assembly configured for use within panels in accordance with aspects of the present subject matter.

Referring now to FIG. 3, a schematic view of one embodiment of a process and related processing equipment (generally designated by 100) for forming a multi-layer panel material assembly is illustrated in accordance with aspects of the present subject matter. As will be described below, the process (and related equipment) shown and described with reference to FIG. 3 may, in one embodiment, form part of an in-line process for manufacturing panels in accordance with aspects of the present subject matter during which the multi-layer panel material assembly is drawn through a given sequence of processing equipment to form a desired panel. Additionally, it should be appreciated that, although FIG. 3 will generally be described with reference to the panel 50 and panel material assembly 80 described above with reference to FIGS. 1 and 2, the process and related processing equipment 100 may generally be used to manufacture multi-layer panel material assemblies having any suitable configuration for use in forming any suitable panels.

As shown in FIG. 3, in the illustrated embodiment, the inner and outer material layers 82, 84 of the panel material assembly 80 are formed from corresponding elongated strips of material(s) 102, 104 configured to be stored on and unwound from corresponding reels 106, 108. As indicated above, the term "strip(s)" is used broadly herein without intent to limit to refer to any suitable strip(s), web(s), piece(s) or other length(s) of material Specifically, the inner material layer 82 is formed from a first or inner elongated material strip 102 supplied from a first reel 106 while the outer material layer 84 is formed from a separate, second or outer elongated material strip 104 supplied from a second reel 108. As shown in FIG. 3, the elongated strips of material 102, 104 are fed through a pair of press wheels 110 (e.g., in a processing direction, as indicated by arrow 112) configured to press the inner and outer material layers 82, 84 together to form the panel material assembly 80. The panel material assembly 80 may then be drawn through the remainder of the processing equipment associated with forming the corresponding panel 50 (e.g., as indicated by box 118 in FIG. 3), various examples of which will be described below.

In one embodiment, the material strip 102 forming the inner material layer 82 is configured to be pre-heated prior to being assembled together with the outer material layer 84 to form the panel material assembly 80. Specifically, as shown in FIG. 3, prior to being delivered to the press wheels 110, the elongated material strip 102 is passed through a pre-heating station 114 configured to heat all or a portion of the elongated material strip 102 to a processing temperature at or above the melting temperature of the associated material, thereby allowing the outer surface(s) of the material strip 102 to become sticky or tacky. As a result, when the inner material strip 102 is subsequently pressed into and against the outer material strip 104 between the press wheels 110, the separate layers 82, 84 may adhere to each other, thereby forming the panel material assembly 80.

It should be appreciated that, in one embodiment, the pre-heating station 114 may only be configured to heat a portion of the elongated material strip 102 forming the inner material layer 82 to a processing temperature at or above its melting temperature. For instance, in one embodiment, the heating station 114 may only be configured to heat the side of the elongated material strip 102 that is configured to be adhered or coupled to the outer material strip 104, such as a bottom side 116 of the material strip 102 in the embodiment shown in FIG. 3. In such an embodiment, the heat source(s) within the pre-heating station 114 may, for example, only be located on the side of the elongated material strip 102 desired to be heated (e.g., the bottom side 116) to allow localized heating of the elongated material strip 102 without requiring the entire strip 102 to be heated to the desired processing temperature. Alternatively, the elongated material strip 102 may have non-homogenous material properties such that the side of the elongated material strip 102 desired to be heated (e.g., the bottom side 116) heats up to the desired processing temperature prior to the opposed side of the elongated material strip 102.

It should also be appreciated that the pre-heating station 114 may generally have any suitable configuration that allows it to heat the elongated material strip 102 to the desired processing temperature. For instance, in one embodiment, the pre-heating station 114 comprises a heated mold or heated plates which conduct heat to the elongated strip 102 as it passes therethrough. In other examples, the pre-heating station 114 may instead blow hot air onto or through the elongated material strip 102, or may suck hot air through the strip 102, or may radiate heat in the form of infrared radiation thereon, for example.

Additionally, it should be appreciated that, in other embodiments, any other suitable equipment or structure (in addition or as an alternative to the press wheels 110) may be utilized to couple the inner and outer material layers 82, 84 together to form the panel material assembly 80. For example, the stacked material layers 82, 84 may be passed through one or more blocks or forming dies or through one or more pairs of opposed plates that serve to push or compress the layers 82, 84 together.

Figure 4:
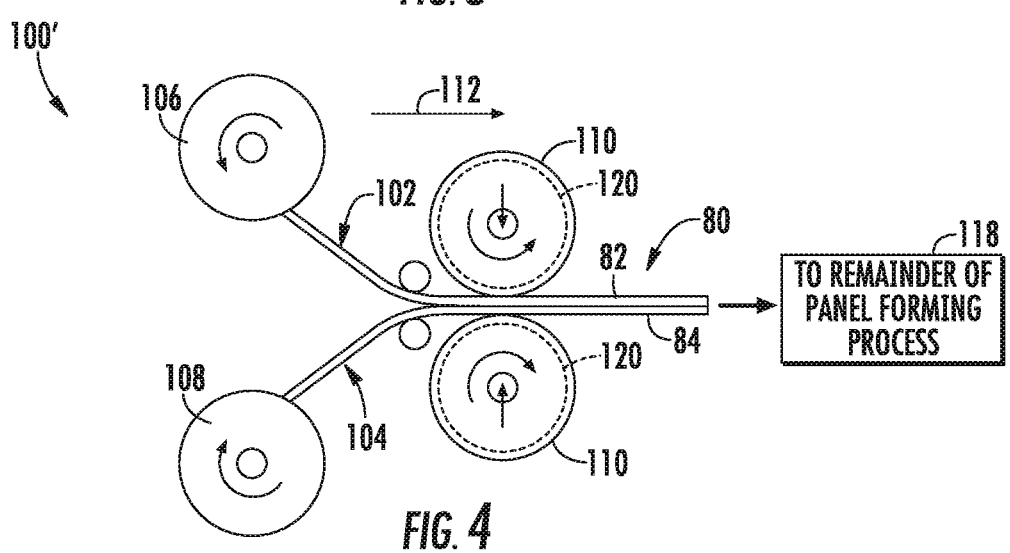
FIG. 4 illustrates a schematic view of another embodiment of a process and related processing equipment for forming a multi-layer panel material assembly configured for use within panels in accordance with aspects of the present subject matter.

Referring now to FIG. 4, a schematic view of another embodiment of a process and related processing equipment (generally designated by 100') for forming a multi-layer panel material assembly is illustrated in accordance with aspects of the present subject matter. As will be described below, the process (and related equipment) shown and described with reference to FIG. 4 may, in one embodiment, form part of an in-line process for manufacturing panels in accordance with aspects of the present subject matter during which the multi-layer panel material assembly is drawn through a given sequence processing equipment to form a desired panel. Additionally, it should be appreciated that, although FIG. 4 will generally be described with reference to the panel 50 and panel material assembly 80 described above with reference to FIGS. 1 and 2, the process and related processing equipment 100' may generally be used to manufacture multi-layer panel material assemblies having any suitable configuration for use in forming any suitable panels.

As shown in FIG. 4, similar to the embodiment described above with reference to FIG. 3, the inner and outer material layers 82, 84 of the panel material assembly 80 are formed from separate first and second elongated strips of materials 102, 104, respectively, configured to be stored on and unwound from corresponding reels 106, 108. However, unlike the embodiment described above that includes a pre-heating station, the elongated material strip 102 forming the inner material layer 82 is configured to be heated and pressed simultaneously via the press wheels 110. Specifically, as shown in FIG. 4, one or both of the press wheels may include heat source(s) 120 (e.g., a resistance-based heating element) provided in association therewith that is configured to heat the elongated material strip 102 forming the inner material layer 82 to a processing temperature at or above its melting temperature, thereby allowing the inner and outer material layers 82, 84 to be adhered or coupled to each other to form the panel material assembly 80 as they are compressed between the press wheels 110. The panel material assembly 80 may then be drawn through the remainder of the processing equipment associated with forming the corresponding panel 50 (e.g., as indicated by box 118 in FIG. 3), various examples of which will be described below.

As indicated above, the outer material layer 84 may have a melting temperature that is higher than the inner material layer 82. As a result, the processing temperature associated with the press wheel(s) 110 may, for example, be higher than the melting temperature for the inner material layer 82, but lower than the melting temperature for the outer material layer 84 to prevent undesirable melting of such outer layer 84. Additionally, it should be appreciated that, if additional heating is required, the heated press wheels 110 shown in FIG. 4 may, for example, be used in combination with a separate heat source, such as the pre-heating station 114 described above with reference to FIG. 3.

As indicated above, in other embodiments, any other suitable equipment or structure may be utilized to couple the inner and outer material layers 82, 84 together to form the panel material assembly 80 in addition (or as an alternative) the press wheels 110. For example, the stacked material layers 82, 84 may be passed through one or more blocks or forming dies or through one or more pairs of opposed plates that serve to push or compress the layers 82, 84 together. In such an embodiment, the block(s), forming die(s), and/or pair(s) of opposed plates may be heated to allow such component(s) to heat the elongated material strip 102 forming the inner material layer 82 to a processing temperature at or above its melting temperature, thereby allowing the inner and outer material layers 82, 84 to be adhered or coupled to each other to form the panel material assembly 80 as they are passed between and/or through the heated component(s).

Figure 5:
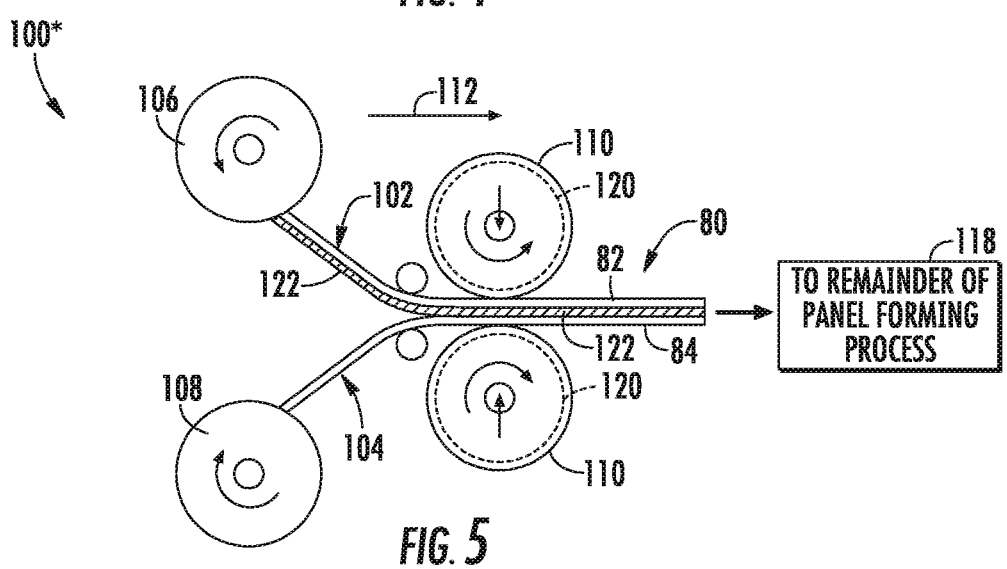
FIG. 5 illustrates a schematic view of a further embodiment of a process and related processing equipment for forming a multi-layer panel material assembly configured for use within panels in accordance with aspects of the present subject matter.

Referring now to FIG. 5, a schematic view of a further embodiment of a process and related processing equipment (generally designated by 100*) for forming a multi-layer panel material assembly is illustrated in accordance with aspects of the present subject matter. As will be described below, the process (and related equipment) shown and described with reference to FIG. 5 may, in one embodiment, form part of an in-line process for manufacturing panels in accordance with aspects of the present subject matter during which the multi-layer panel material assembly is drawn through a given sequence of processing equipment to form a desired panel. Additionally, it should be appreciated that, although FIG. 5 will generally be described with reference to the panel 50 and panel material assembly 80 described above with reference to FIGS. 1 and 2, the process and related processing equipment 100* may generally be used to manufacture multi-layer panel material assemblies having any suitable configuration for use in forming any suitable panels.

As shown in FIG. 5, similar to the embodiments described above with reference to FIGS. 3 and 4, the inner and outer material layers 82, 84 of the panel material assembly 80 are formed from separate first and second elongated strips of materials 102, 104, respectively, configured to be stored on and unwound from corresponding reels 106, 108. However, unlike the embodiments described above, the panel material assembly 80 includes an intermediate layer 122 disposed directly between the inner and outer material layers 82, 84. As shown in the illustrated embodiment, the intermediate layer 122 has been pre-applied to the side of the material strip 102 forming the inner material layer 82 that is configured to be coupled to the material strip 104 forming the outer material layer 84 (e.g., the bottom side). Alternatively, the intermediate layer 122 may be pre-applied to the outer material strip 104 or the intermediate layer 122 may be supplied from a separate reel.

In several embodiments, the intermediate layer 122 may correspond to an adhesive layer formed from any suitable type of adhesive. In such embodiments, the intermediate layer 122 may be heated to activate the adhesive, thereby allowing the inner and outer material layers 82, 84 to be adhered to each other. For instance, in the embodiment shown in FIG. 5, the press wheels 110 are configured as heated press wheels (e.g., by including a heat source(s) 120 to allow the intermediate layer 122 to be heated to its activation temperature. In addition to the heated press wheels 110 (or as an alternative thereto), a separate pre-heating station may be utilized (e.g., similar to the embodiment shown in FIG. 3) or separate heated equipment or components (e.g., one or more heated dies or form blocks and/or one or more pairs of heated plates) to heat the intermediate layer 122 to its activation temperature. For instance, when the intermediate layer 122 is pre-applied to one of the material strips 102, 104, such material layer may be passed through the heating station together with the intermediate layer 122 to pre-heat the intermediate layer 122 to its activation temperature. Regardless, upon activation, the intermediate layer 122 may facilitate adherence of the inner and outer material layers 82, 84 to each other to form the panel material assembly 80. The panel material assembly 80 may then be drawn through the remainder of the processing equipment associated with forming the corresponding panel 50 (e.g., as indicated by box 118 in FIG. 3), various examples of which will be described below.

It should be appreciated that, when using an intermediate layer 122 to adhere the inner and outer material layers 82, 84 to each other, the activation temperature for the intermediate layer 122 may, in several embodiments, correspond to a processing temperature that is less than the melting temperatures for both the material layers 82, 84. In such embodiments, the intermediate layer 122 may be activated without melting either material layer 82, 84 (particularly the inner material layer 82) when forming the panel material assembly 80.

As indicated above, the various implementations of the processes and related processing equipment described with reference to FIGS. 3-5 may, in several embodiments, form part of a larger in-line process (and, thus, a larger assembly of processing equipment) for manufacturing panels in accordance with aspects of the present subject matter. In this regard, various embodiments of processes and related processing equipment for manufacturing panels using a multi-layer panel material assembly will now be described below.

In several embodiments, the disclosed panel-forming process utilizes a heating station configured at least in part as a heated mold. In such an embodiment, the multi-layer panel material assembly may be drawn through the heated mold, with the mold heating the panel material assembly to and/or maintaining the assembly at a given temperature selected, for example, based at least in part on the material properties of the inner material layer. For instance, in one embodiment, the panel material assembly may be heated to a processing temperature that is equal to or greater than the forming temperature of the inner material layer, but less than the forming temperature of the outer material layer. As the elongated panel material assembly is drawn through the heated mold, the mold deforms the heated assembly into a desired panel shape. In doing so, the panel material assembly may be drawn through the heated mold at a constant speed, with the speed of the material and the temperature of the mold optionally being controlled by a central control unit.

In one embodiment, the heated mold may deform the heated panel material assembly on both elongate sides thereof, thereby forming a flange on either side of the elongate strip. In one embodiment, the angle α (FIG. 1) between each flange and the elongate heated panel assembly is less than or equal to approximately 90° and/or greater than or equal to approximately 25°, including any angles defined therebetween in increments of 5°.

Additionally, in one embodiment, aspects of the disclosed process may also include pre-heating the panel material assembly to a given pre-heat temperature selected, for example, based at least in part on the material properties of the inner material layer. For example, in one embodiment, the panel material assembly may be pre-heated to a processing temperature at or just below the forming temperature of the inner material layer. Such pre-heating may take place before the panel material assembly enters the heated mold and may, for example, include blowing heated air onto a surface of the panel material assembly (e.g., the surface of the inner material layer) as the material assembly is drawn through the heated air flow. Alternatively, heated air may be sucked through the panel material assembly as the assembly is drawn through the pre-heating apparatus.

Additionally or alternatively, such pre-heating may include drawing the elongated panel material assembly through a pre-heating mold. In one embodiment, the pre-heating mold may serve to heat the material only, and thus, does not act to deform the material. The pre-heating mold may be part of the heated mold or may be a separate apparatus, such as an infrared heating device or an air heated oven, for example.

Furthermore, in one embodiment, aspects of the disclosed process also include cooling the panel material assembly after the assembly exits the heated mold. Cooling the panel material assembly may comprise blowing air at or below ambient temperature onto or through the panel material assembly as the assembly is drawn through the air flow. Alternatively, the air may be sucked through the panel material assembly as the assembly is drawn through the cooling apparatus.

Additionally or alternatively, the cooling process may include drawing the panel material assembly through a cooling mold. In one embodiment, the cooling mold may serve to cool the material while maintaining its formed shape. The cooling mold may be part of the heated mold or may be a separate apparatus.

Additionally, in one embodiment, aspects of the disclosed process may also include cutting the elongated panel material assembly into desired linear panel lengths. Cutting may be carried out by a guillotine, a rotary blade, a heated wire, or by ultrasonic cutting apparatus, for example. In one embodiment, cutting of the elongated panel material assembly into desired linear panel lengths may be performance after the assembly has been cooled, such as to a temperature below the forming temperature of the inner material layer.

Moreover, in several embodiments, the panel material assembly may be drawn through the heated mold by rollers. In such embodiments, the rollers may advantageously act to pull the panel material assembly through the heated mold, and may include features, such as spikes, to facilitate such pulling. As an alternative, rollers with a sticky surface, or rollers made of or having a surface made of or covered by a high friction material, such as rubber or sand paper, may be used instead.

Figure 6:
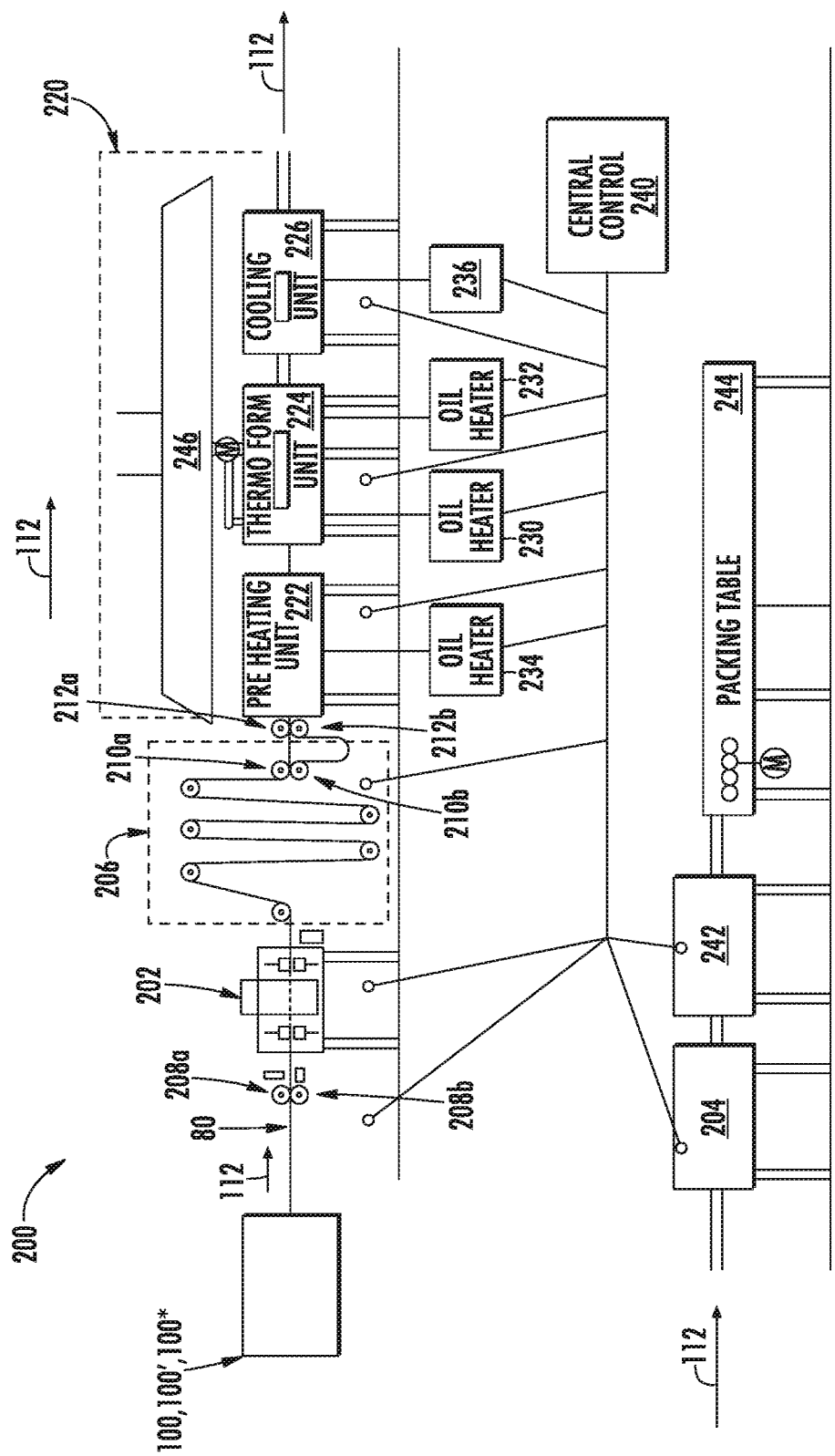
FIG. 6 illustrates a schematic view of one embodiment of an in-line process and related equipment for forming a panel in accordance with aspects of the present subject matter, particularly illustrating the process incorporating aspects of a process for forming a multi-layer panel material assembly used to manufacture the panel.

Further, in one embodiment, the heated mold may comprise a plurality of form blocks each having a different cut-out shape such that, when the panel material assembly passes through the heated mold, the assembly passes through each of the form blocks in turn, thereby gradually changing the shape of the assembly from a flat, elongated multi-layered strip to a linear panel having a desired panel shape. For instance, the form blocks may form all or part of a progressive heated mold used to progressively or gradually form the panel material assembly into the desired panel shape For instance, FIG. 6 illustrates a schematic view of one embodiment of an in-line process and related processing equipment (generally designated by 200) for manufacturing panels using a heated mold in accordance with aspects of the present subject matter. In the illustrated embodiment, the process and related processing equipment for forming the multi-layer panel material assembly are indicated schematically in FIG. 6 as a solid box labeled 100, 100', 100*, with the output of such process/equipment corresponding to the panel material assembly 80 (e.g., including the inner and outer material layers). It should be appreciated that the specific process/equipment represented by box 100, 100', 100* may generally correspond to any suitable process/equipment consistent with the disclosure provided herein, such as any of the embodiments shown in FIGS. 3-5.

As shown in FIG. 6, in one embodiment, an initial downstream component 202 of the processing equipment is configured to initially receive the multi-layer panel material assembly 80 (e.g., as represented by the elongated strip shown in FIG. 6 extending along the length of the processing path in the processing direction, as indicated by arrows 112). For instance, the downstream component 202 may be positioned downstream of the press wheels 110 (FIGS. 3-5) such that the panel material assembly 80 is continuously drawn from its formation along the processing path in the processing direction 112. Thus, as a downstream portion of the panel material assembly 80 is being drawn through the downstream component 202 (and the remainder of the processing equipment along the processing path), an upstream portion of the panel material assembly 80 is simultaneously being formed as part of the continuous, stream-lined process. It should be appreciated that, although FIG. 6 illustrates an embodiment of the in-line process 200 in which the panel material assembly 80 is drawn through a continuous sequence of processing equipment to form the desired panel, the various processing steps or operations associated with the in-line process 200 may, instead, be performed using a non-continuous or interrupted sequence of processing equipment.

In one embodiment, the downstream component 202 configured to initially receive the panel material assembly 80 may correspond to a strip-coupling apparatus configured to couple the end of one panel material assembly 80 to the beginning of another panel material assembly 80, as desired or needed (e.g., when switching out the coils containing the inner and outer material layers), thereby enabling the material assembly 80 to be continuously fed along the processing path from one station (or piece of equipment) to another. In one embodiment, the strip-coupling apparatus may staple, stick, tape, or sew the ends together, or may couple the separate assemblies 80 together in any other known manner. For instance, in a particular embodiment, the strip-coupling apparatus may comprise an ultrasonic welding apparatus, such as an ultrasonic knife, for simultaneous splicing and cutting the panel material assemblies 80.

In the illustrated embodiment, the panel material assembly 80 is pulled through the heated mold by a pulling device 204, which may include one or more rollers having spikes or a high friction material, such as rubber or sand paper, on the roller surface for gripping and pulling the material assembly 80. In one embodiment, in order to minimize stretching of the panel material assembly 80, the pulling force exerted on the assembly by the pulling device 204 is carefully controlled and the temperature of the assembly at the pulling device 204 is maintained at or below a given temperature to minimize stretching.

Optionally, a buffer (accumulator) 206 may be provided to readily enable the panel material assembly 80 to be passed through the heated mold at a constant speed, regardless of whether separate assemblies are in the process of being joined together or not. In one embodiment, it may be desirable that the panel material assembly 80 be passed through the heated mold at a constant speed and that the temperature of the heated mold be accurately controlled, as these two factors control the melting of the inner material layer and hence the strength, shape, and/or other properties or characteristics of the finished panel.

As shown in FIG. 6, rollers 208a, 208b, 201a, 210b, 212a, 212b are provided to pull the material assembly 80 through the buffer 206. These rollers may have spikes or a high friction material, such as rubber or sand paper, on the roller surface for gripping and pulling the material assembly 80 along the processing path in the associated processing direction 112.

In the embodiment shown in FIG. 6, a molding unit 220 is provided that includes a pre-heating unit 222, a thermoforming unit 224, and a cooling unit 226. Alternatively, the molding unit 220 may only include the thermoforming unit 224, with the pre-heating and cooling units 222, 226 being provided independent of and upstream/downstream of the molding unit 220, respectively.

Pre-heating the panel material assembly 80 to a given pre-heat temperature selected, for example, based on the material properties of the inner material layer may help to strengthen the materials contained within the assembly 80 and may encourage any pre-shrinking of the materials prior to entry into the thermoforming unit 224 of the molding unit. For example, in one embodiment, the panel material assembly 80 may be pre-heated to a temperature at or around the forming temperature of the inner material layer of the panel material assembly 80 (but less than the forming temperature of the outer material layer of the panel material assembly 80). In general, it is desirable that shrinkage of the panel material assembly 80 during manufacture of the panel is minimized as the dimensions of the finished panel should permit the panel to be successfully mounted onto a carrier. Where the carrier has recesses configured to receive and retain the flanges of the panel, it will be appreciated that the size of the finished panel is particularly important, and including a low temperature pre-heating of the panel material assembly prior to formation of the panel advantageously prevents or limits excessive shrinking of the material assembly during the remainder of the manufacturing process. In order to control the effects of any further shrinking of the panel material assembly during manufacture of the panel, the temperature to which the material assembly is heated and the speed at which the material assembly proceeds along the processing path preferably is accurately controlled during the panel manufacturing process Additionally, by providing the pre-heating unit 222, the portion of the panel material assembly 80 entering the thermoforming unit 224 can, for example, be at the required forming temperature so that there is no need for the material to be heated in the thermoforming unit prior to forming the panel, thereby enabling the material assembly 80 to pass through the thermoforming unit at an increased speed, with the result that the production rate of the panels is increased. If no pre-heating is provided, the panel material assembly 80 generally will need to be heated by the heated mold to reach the required forming temperature before the material can be formed into a linear panel. In other embodiments, a combination of pre-heating and heating within the thermoforming unit can be utilized to heat the panel material assembly 80 during the forming process.

In one embodiment, the pre-heating unit 222 comprises a heated mold or heated plates which conduct heat to the elongated strip forming the panel material assembly 80 as it passes therethrough. In other examples, the pre-heating unit 222 may instead blow hot air onto or through the elongated panel material assembly 80, or may suck hot air through the assembly 80, or may radiate heat in the form of infrared radiation thereon, for example.

In one embodiment, the thermoforming unit 224 comprises a heated mold for thermoforming the panel into a desired shape, the shape being dictated by the heated mold.

In one embodiment, the thermoforming unit 224 may be heated by hot oil which passes through channels in the mold to heat up the mold. The oil may be heated by oil heaters 230, 232. The heaters 230, 232, and therefore the temperature of the oil, are controlled by a central control unit 240. Heater 230 may be controlled to heat the oil to a different temperature than heater 232, so that the panel material assembly 80 passing through the thermoforming unit 224 experiences a step-wise, or, alternatively, a gradual increase in temperature as it passes through the thermoforming unit 224. Such an arrangement may be particularly advantageous where there is no pre-heating unit provided.

In one embodiment, a separate oil heater 234 may also be provided for the pre-heating unit 222, with the oil heater 234 similarly being configured to be controlled by the central control unit 240. The thermoforming unit 224 may be heated by other means, however providing hot oil in channels formed in the unit 224 is advantageous as the oil will tend to retain heat longer than many other common liquids, such as water, and can be used to accurately control the temperature of the heated mold and therefore the temperature of the panel material assembly 80 passing therethrough.

In one embodiment, the heated mold heats and/or maintains the temperature of the panel material assembly 80 at a given temperature selected, for example, based on the material properties of the inner material layer. For instance, in one embodiment, the heated mold heats and/or maintains the temperature of the panel material assembly 80 at a processing temperature greater than or equal to the temperature at which the material(s) of the inner material layer of the material assembly 80 become soft and deformable, such as at a temperature at or above the forming temperature associated with the inner material layer. In general, overheating is not desirable—the forming temperature of the heated mold should be set such that the panel material assembly 80 is able to be deformed into the panel shape as it passes through the heated mold while enabling the outer material layer of the material assembly 80 to, for example, retain its desired properties or characteristics, such as the desired decorative or aesthetic appearance (e.g., a fibrous, felt-like appearance when the outer material layer formed from a felt material). In addition to such aesthetic considerations, the fibrous nature of the outer surface of the panel (i.e., as formed by the outer material layer) generally may allow for sound to be absorbed by the panel, thereby enhancing the acoustic properties of the panel and attenuating unwanted noise in rooms in which the panel is installed. As such, the processing temperature within the heating mold is preferably selected to be less than the forming temperature of the outer material layer of the panel material assembly 80.

As indicated above, a cooling unit 226 may form part of the molding unit 220 or may be provided separately and downstream of the molding unit 220. In general the cooling unit 226 may comprise a mold, form blocks, and/or a channel(s) through which the panel material assembly 80 passes. In one embodiment, fluid is supplied to the cooling unit 226 from fluid reservoir 236. The cooling unit may be in the form of a cooling mold through which the formed material assembly 80 passes. In this case, the fluid reservoir 236 may supply a cooled liquid, such as cooled oil, to channels formed in the cooling unit 226. The cooling unit 226 is preferably configured to support and maintain the shape of the panel and to cool the material assembly 80 such that the material assembly 80 exiting the cooling unit is at a temperature of no more, for example, than a predetermined cool-down temperature set for the assembly 80. This permits the material(s) of the inner material layer be fixed into position and sets and stabilizes the final shape of the panel.

In an alternative embodiments, the fluid reservoir 236 supplies air to the cooling unit 226. The air may be at ambient temperature or may be cooled, and may be blown across, through or onto the surface of the panel material assembly 80 passing through the cooling unit 226, or may be sucked through the material assembly 80 as it passes through the cooling unit. In such an embodiment, the formed panel may, for example, be supported within a channel shaped to match the desired shape of the panel while the material assembly 80 of the panel is being sufficiently cooled so as to fix the material(s) of the inner material layer into position and thereby set the final shape of the finished panel.

In one embodiment, the cooling process (as indeed the heating process) may be dependent upon the speed at which the panel material assembly 80 is fed through the cooling (or heating) stages. For example, in one embodiment, at speeds of approximately 2 meters/minute, passing the material assembly 80 through ambient air generally should be sufficient to permit satisfactory cooling thereof. However, at faster speeds of 10 to 20 meters/minute, cooled air may need to be blown directly onto or sucked through the panel material assembly 80 in order to achieve satisfactory cooling of the material assembly given the faster processing speed. Additionally or alternatively, the panel material assembly 80 may be passed through a chilled mold. It should be appreciated that, in addition to the speed at which the material assembly 80 is fed through the cooling (or heating stages), the actual length of such stage(s) may also impact the cooling (or heating) process. For instance, for a longer cooling stage, ambient air may be used for cooling at faster processing speeds than for a significantly shorter cooling stage.

Once the formed panel has cooled, it is able to be pulled without causing unwanted stretching of the material, and the pulling device 204 may be provided for this purpose. Finally, the cooled, elongated panel may be cut into two or more elements of desired lengths by cutting unit 242.

It should be appreciated that, in one embodiment, the pre-heating and cooling units may heat/cool the panel material assembly on one side only. For instance, it may be desirable for the panel material assembly to only be heated/cooled along the side of the assembly containing the inner material layer.

In one embodiment, a packing table 244 may be provided at the downstream end of the production apparatus.

Additionally, in one embodiment, an extractor unit 246 may also be provided in the vicinity of the heated mold and/or any pre-heating or cooling units to remove surplus heat from the surrounding area.

In one embodiment, the material assembly 80 may be passed in the processing direction 112 through the processing equipment contained along the processing path at speeds of greater than or equal to approximately 10 meters/minute and/or less than or equal to 20 meters/minute, including any speeds defined therebetween in increments of 1 meter/minute. Additionally, in one embodiment, the speed of transit and the temperature of the pre-heating unit 222, thermoforming unit 224, and/or the cooling unit 226 may be controlled by central control unit 240.

In one embodiment, the central control unit 240 may be configured to implement closed-loop control of one or more components of the processing equipment, such as the motor(s) associated with the reels 106, 108 (FIGS. 3-5) and/or the press wheels 110 (FIGS. 3-5), the strip-coupling apparatus 202, the accumulator 206, any suitable component(s) of the molding unit 220, one or more of the heaters 230, 232, 234, the pulling device 204, the cutting unit 242, and/or any other suitable components or equipment utilized in forming a panel as described herein. As such, the central control unit 240 may be communicatively coupled to any number of sensors or other inputs devices configured to provide operational feedback to the unit 240, such as temperature sensors, speed sensors, and/or the like. For instance, temperature sensors provided in operative association with the pre-heating unit 222, the thermo-forming unit 224, and/or the cooling unit 226 may be configured to provide temperature feedback to the central control unit 240, which may then allow the control unit 240 to adjust the processing temperature and/or processing speed, as necessary or desired, of the panel material assembly 80 as it is drawn along the processing path in the processing direction 112.

It should be appreciated that, in one embodiment, the central control unit 240 may correspond to any suitable processor-based device(s), such as a computing device or any combination of computing devices. Thus, the central control unit 240 may generally include one or more processor(s) and associated memory devices configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor(s), including data that can be retrieved, manipulated, created and/or stored by the processor(s) and instructions that can be executed by the processor(s). For instance, computer-readable instructions may be stored within the memory that, when implemented the processor(s), configure the central control unit 240 to perform one or more of the control functions described herein.

Figure 7:
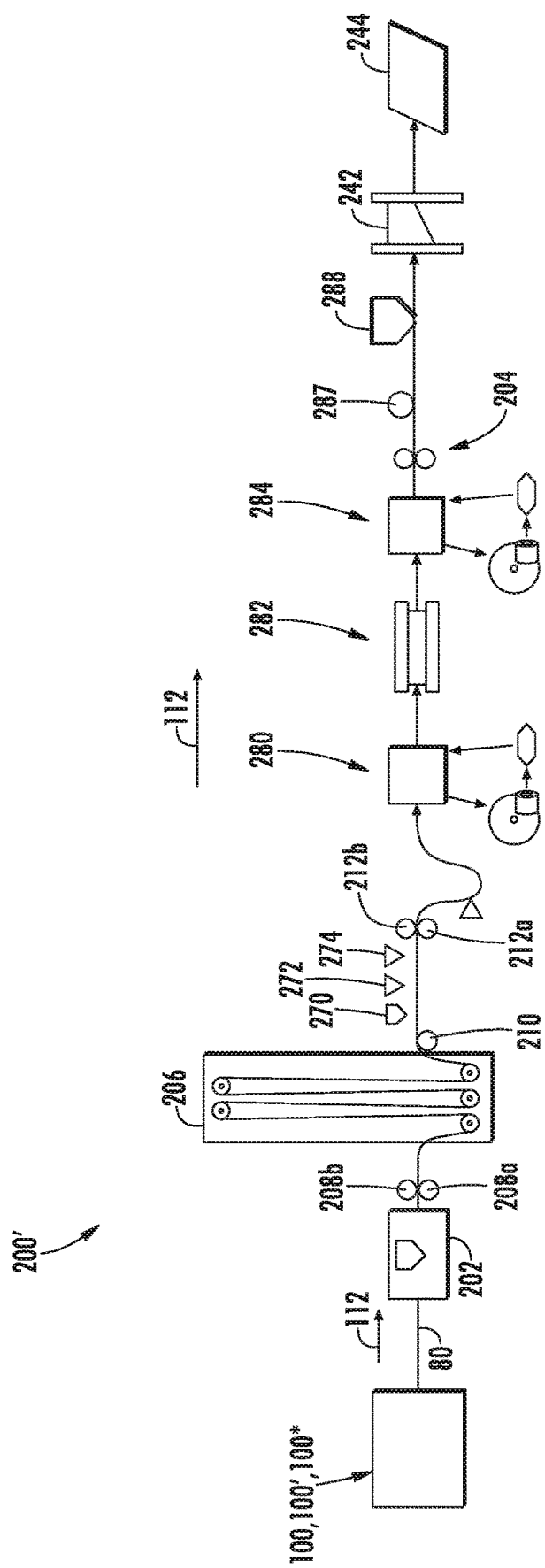
FIG. 7 illustrates a schematic view of another embodiment of an-line process and related equipment for forming a panel in accordance with aspects of the present subject matter, particularly illustrating the process incorporating aspects of a process for forming a multi-layer panel material assembly used to manufacture the panel.

Referring now to FIG. 7, a schematic view of another embodiment of an in-line process and related processing equipment (generally designated by 200') for manufacturing panels using a heated mold is illustrated in accordance with aspects of the present subject matter. In the illustrated embodiment, the process and related processing equipment for forming the multi-layer panel material assembly are indicated schematically in FIG. 7 as a solid box labeled 100, 100', 100*, with the output of such process/equipment corresponding to the panel material assembly 80 (e.g., including the inner and outer material layers). It should be appreciated that the specific process/equipment represented by box 100, 100', 100* may generally correspond to any suitable process/equipment consistent with the disclosure provided herein, such as any of the embodiments shown in FIGS. 3-5. Additionally, it should be appreciated that the process and related equipment shown in FIG. 7 are similar to the process/equipment described above with reference to FIG. 6 and, thus, only notable differences between the two embodiments will be described in any detail.

As shown, similar to the embodiment described above, an initial downstream component 202 of the processing equipment is configured to initially receive the multi-layer panel material assembly 80 (e.g., as represented by the elongated strip shown in FIG. 7 extending along the length of the processing path in the processing direction, as indicated by arrows 112). For instance, the downstream component 202 may be positioned downstream of the press wheels 110 (FIGS. 3-5) such that the panel material assembly 80 is continuously drawn from its formation along the processing path in the processing direction 112. Thus, as a downstream portion of the panel material assembly 80 is being drawn through the downstream component 202 (and the remainder of the processing equipment along the processing path), an upstream portion of the panel material assembly 80 is simultaneously being formed as part of the continuous, stream-lined process. As indicated above, in one embodiment, the downstream component 202 may correspond to a strip-coupling apparatus configured to couple the end of one panel material assembly to the beginning of another panel material assembly, as desired or needed, thereby enabling the material assembly to be continuously fed along the processing path from one station (or piece of equipment) to another. It should be appreciated that, although FIG. 7 illustrates an embodiment of the in-line process 200' in which the panel material assembly 80 is drawn through a continuous sequence of processing equipment to form the desired panel, the various processing steps or operations associated with the in-line process 200 may, instead, be performed using a non-continuous or interrupted sequence of processing equipment.

Additionally, the panel material assembly 80 is pulled through the heated mold by a pulling device 204, which may include rollers having features or elements which grip and pull the material, such as spikes or a high friction material, such as rubber or sand paper, on the roller surface. In one embodiment, in order to minimize stretching of the material, the pulling force exerted on the material assembly 80 by the pulling device 204 is carefully controlled. Moreover, an optional buffer (accumulator) 206 may be provided to readily enable the panel material assembly 80 to be passed through the heated mold at a constant speed, regardless of whether separate material assemblies are in the process of being joined together or not. In one embodiment, the material assembly 80 is pulled through the buffer 206 by the pulling rollers 208a, 208b, 210, 212a, 212b which may incorporate small spikes or a high friction material, such as rubber or sand paper, on the roller surface or other features or elements to grip and pull the material.

In the illustrated embodiment, an optional metal detection unit 270 may also be provided for detecting, for example, needles or broken needle tips which are present in the panel material assembly 80. Where the metal detection unit is provided, there may also be provided a needle marking unit 272 for marking for identification purposes the location of a metal piece in the panel material assembly 80. The marking unit may comprise a pen or may comprise a stamping device or an inking device, for example. Such a metal detection unit and marking unit could also be provided in any of the other various embodiments of the disclosed process/equipment described herein.

Optionally, a branding unit 274 may also be provided to add logos or other designs, patterns, and/or indicia to the panel material assembly 80 as it passes along the processing path through the related equipment. Again, such a branding unit could also be provided in any of the other various embodiments of the disclosed process/equipment described herein.

As shown in FIG. 7, a pre-heating unit 280 is provided that includes an air heater and an air blower. The air is heated by the air heater and then blown onto the surface of the panel material assembly 80 as it passes through the pre-heating unit 280. In one embodiment, the heated air is able to rapidly heat the material assembly 80 as it passes through to a given temperature, such as to a processing temperature at or around the forming and temperature of the inner material layer of the material assembly 80 (but below the forming temperature of the outer material layer of the material assembly 80). In one embodiment, the air may exit the air heater at a higher temperature than the temperature to which the panel material assembly is being heated 80. In other examples, the air heated by the air heater may be sucked through the panel material assembly 80 as it passes through the pre-heating unit 280. Additionally, in one embodiment, the temperature of the panel material assembly 80 may be monitored as it passes through the pre-heating unit 280 and the temperature and/or speed of the air flow and/or the speed of the material assembly 80 may be adjusted to maintain the temperature of the material assembly 80 at a desired level to provide consistent, uniform heating thereof.

The pre-heated panel material assembly 80 is then drawn into the heated mold 282. In this example, the mold is an oil-heated mold similar to that described above with reference to FIG. 6. In one embodiment, the heated mold 282 maintains the temperature of the panel material assembly 80 at given temperature selected, for example, based on the material properties of the inner material layer as it passes through the heated mold. Optionally, a further pre-heating mold may be provided before the heated mold 282 if the pre-heating unit 280 does not provide sufficient heat.

Figure 8:
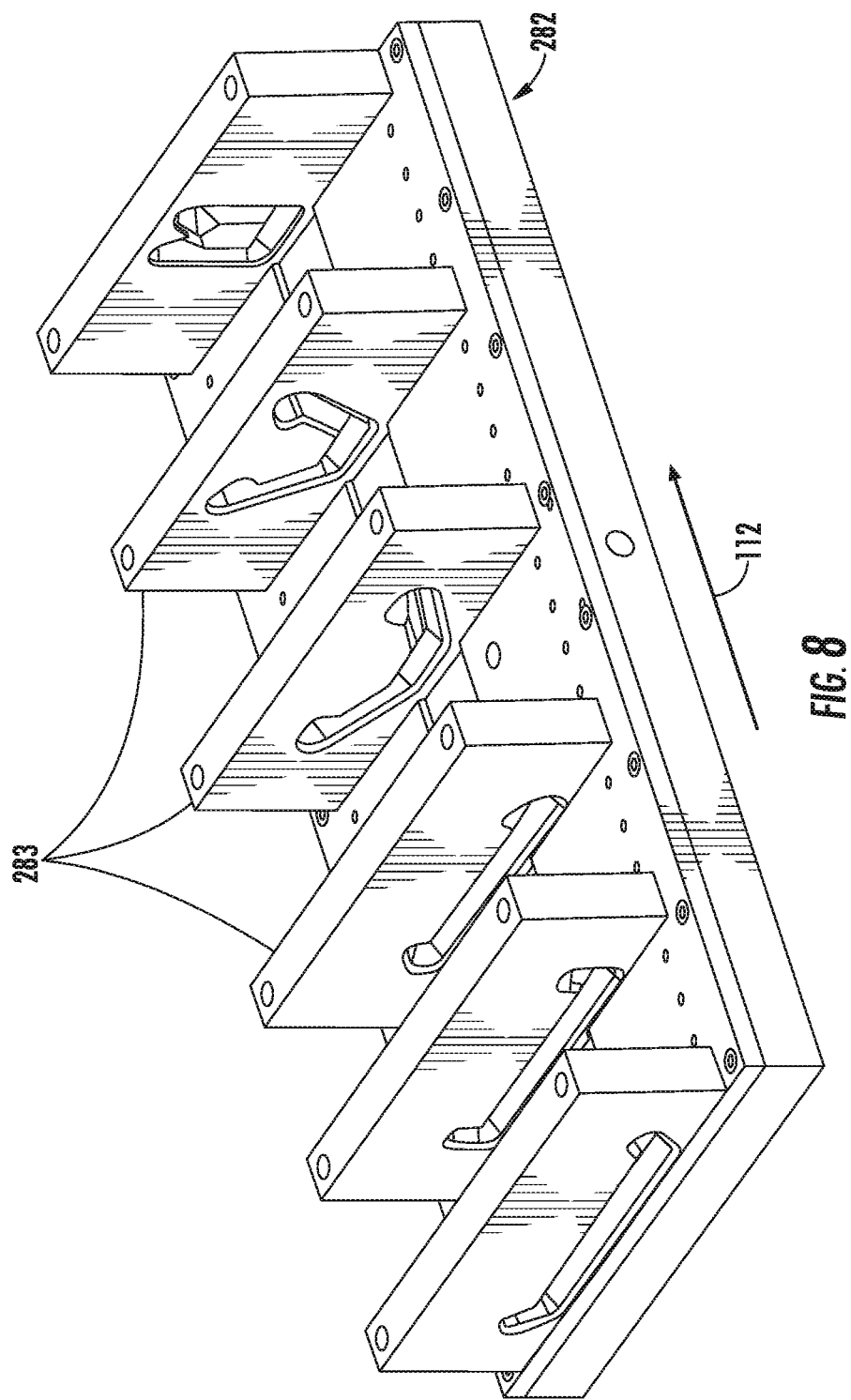
FIG. 8 illustrates a perspective view of one embodiment of a plurality of form blocks included within a heated mold in accordance with aspects of the present subject matter.

In one embodiment, the heated mold 282 comprises a plurality of form blocks 283, examples of which are shown in FIG. 8. The form blocks 283 are able to be fitted into and removed from the heated mold 282, and act to gradually deform the heated panel material assembly 80 as it passes through each form block. Specifically, the portion of the panel material assembly 80 entering the heated mold 282 passes through each of the form blocks in turn in the processing direction (e.g., as indicated by arrow 112 in FIG. 8), with each form block further deforming the panel material assembly 80 so that it leaves the heated mold in the form of a linear panel having the desired shape (e.g., the shape of the die of the final form block). If desired, the form blocks may be provided with guided surfaces to further assist the guidance of the panel material assembly 80 through the form blocks.

Referring back to FIG. 7, a cooling unit 284 is provided downstream of the heated mold 282. The cooling unit may, for example, comprise an air pump and a heat exchanger for cooling the air. In other embodiments, the cooling unit may not require a heat exchanger if air at ambient temperature is to be used rather than cooled air. The cooled or ambient air is sucked through the panel material assembly 80 as it passes through the cooling unit. In other examples, the cooled or ambient air may be blown onto the panel material assembly 80 as it passes through the cooling unit. One or more cooling units may be provided such that the panel material assembly 80 exiting the cooling unit is lowered to a final, desired temperature. This permits the material(s) of the inner material layer to be fixed into position and sets and stabilizes the final shape of the panel, ready for cutting to length.

Figure 9:
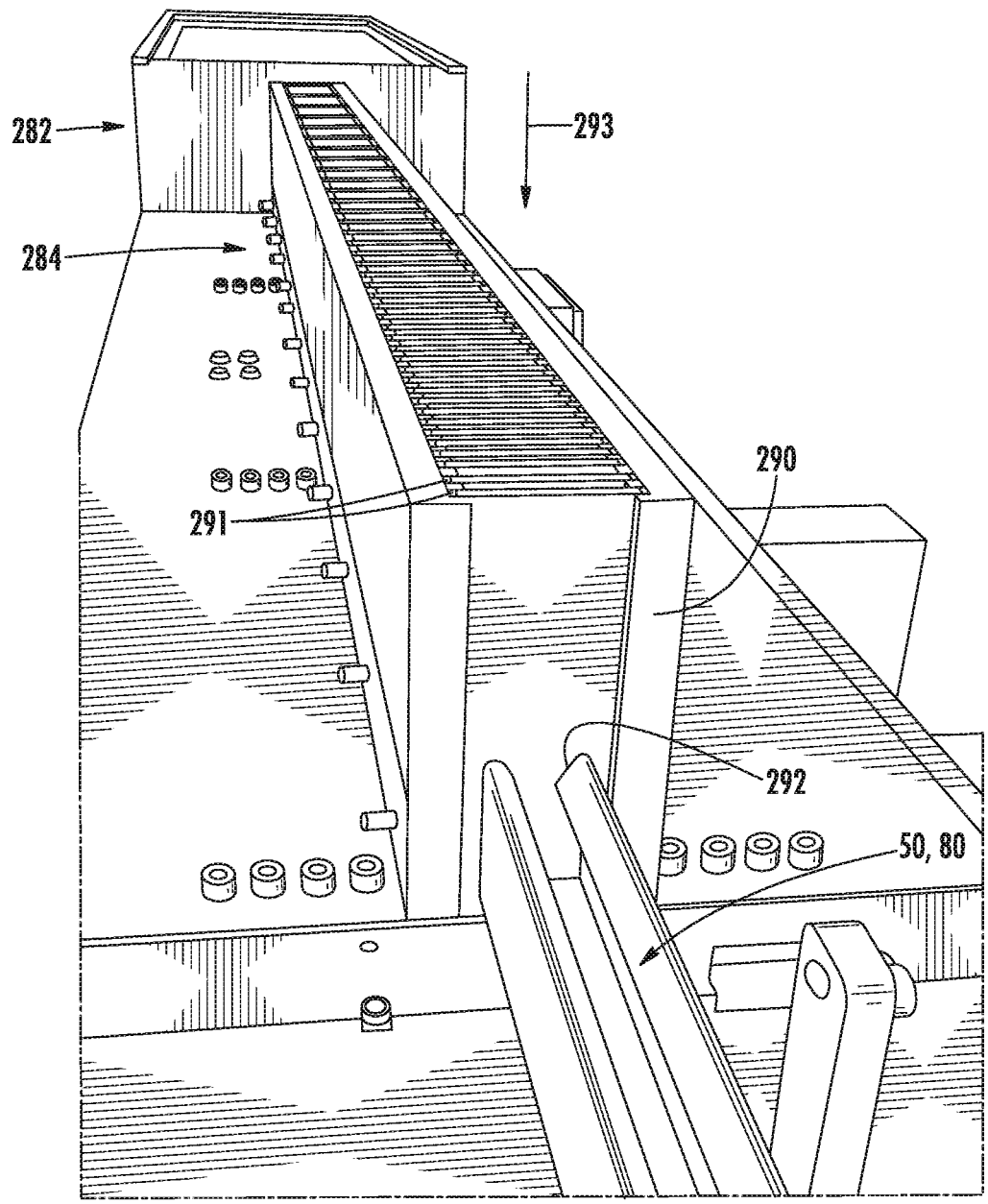
FIG. 9 illustrates a perspective view of one embodiment of a cooling unit that may be utilized in accordance with aspects of the present subject matter for cooling panel materials.

In one embodiment, the cooling unit 284 may include one or more form blocks having cut-outs in the shape of the finished panel and being spaced apart from each other, thereby allowing the cooling air to make contact with and/or pass through the portions of the formed panel material assembly extending between the form blocks. An example of such a cooling unit is shown in FIG. 9. As can be seen in FIG. 9, the cooling unit 284 includes a form block holder 290 holding a plurality of form blocks 291. Each of the form blocks 291 has the same cut out shape 292 for accommodating and maintaining the formed panel shape of the elongated material assembly 80 as it passes through the cooling unit. The air flow 293 is able to contact and/or pass through the panel material assembly 80 where it is exposed between the form blocks as it is drawn through the cooling unit, thereby cooling the material assembly 80. In one embodiment, the temperature of the material assembly 80 may be monitored as it passes through the cooling unit and the temperature and/or speed of the cooling air flow and/or the speed of the material assembly may be adjusted to enable the temperature of the material assembly to reach a desired level upon exit from the cooling unit. As indicated above, by the time the material assembly exits the cooling unit, it is preferably at a given exit temperature, such as a temperature well below the forming temperature of the inner material layer of the material assembly 80. In FIG. 9, there are approximately 100 form blocks, each of approximately 6 mm thickness and with a spacing of approximately 10 mm between adjacent form blocks. However, the number of form blocks, the thickness of the form blocks, and the spacing between the form blocks may be arranged as desired.

Once the panel has cooled, it is more readily pulled without unwanted stretching of the material and the pulling device 204 may be provided for this purpose. As indicated above, the pulling device pulls the material assembly 80 through the processing equipment including the pre-heating unit, the forming mold and the cooling unit. In one embodiment, the pulling device 204 may include two rollers, one located adjacent the other with the elongated panel material assembly 80 passing between the rollers, as shown in FIG. 7.

Figure 10:
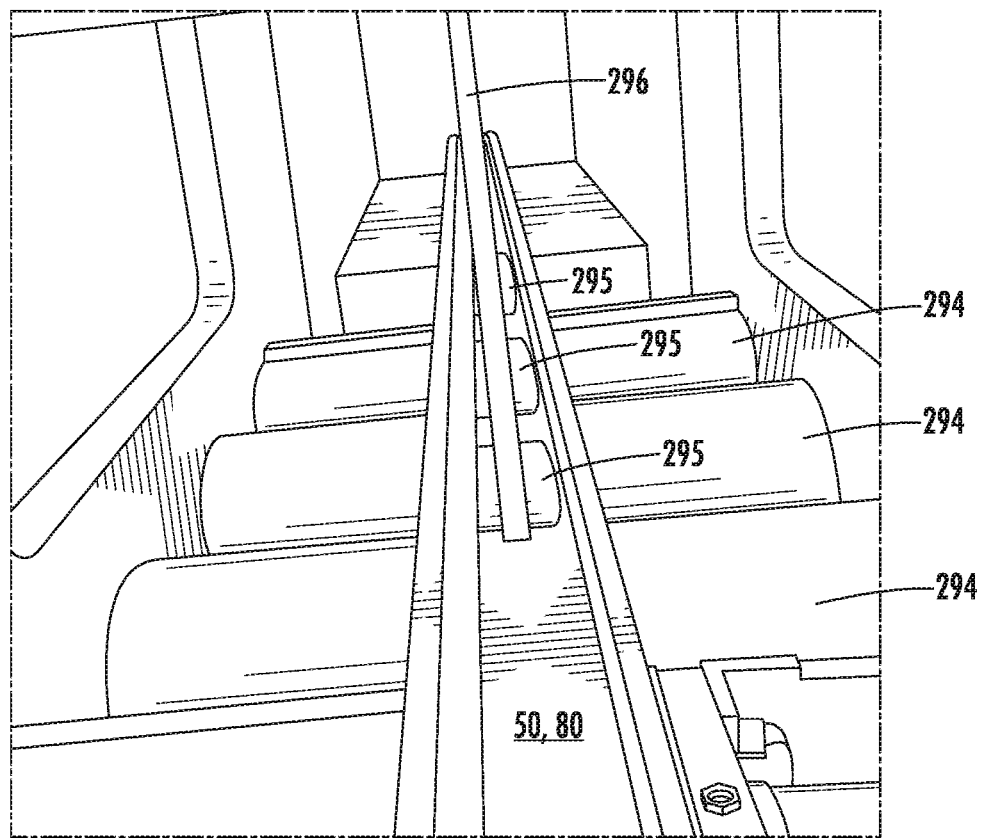
FIG. 10 illustrates a perspective view of one embodiment of a pulling device that may be utilized in accordance with aspects of the present subject matter for pulling panel materials.

Alternatively, the pulling device may be configured as shown in FIG. 10. In the embodiment shown in FIG. 10, the pulling device includes three rollers 294, with each roller being arranged one after the other along the processing direction of the panel material assembly 80 and having a surface incorporating spikes or a rough surface, such as sandpaper, and a further roller, wheel or ball bearing 295 located adjacent each roller 294. Although this example shows three rollers, there may be more or fewer rollers 294, each having an adjacent roller, wheel or ball bearing 295. In such an embodiment, the panel material assembly 80 is pulled between the roller 294 and the adjacent roller, wheel, or ball bearing 295 by the rotation of the roller 294. The roller, wheel, or ball bearing may have a smooth surface, in contrast to roller 294, and is supported by rod 296. The roller, wheel, or ball bearing 295 may be biased towards the roller 294. The roller, wheel, or ball bearing 295 acts to keep the panel material assembly 80 in contact with the roller 294 so that rotation of the roller 294 acts to move the material assembly 80 along in a linear direction approximately tangential to the surface of the roller 294, thereby pulling the material assembly through the pre-heating, molding, and cooling apparatus.

Referring back to FIG. 7, an optional distance counting unit 287 may also be provided. The distance counting unit ensures that the panels are cut at an equal, desired length. Moreover, an optional weld recognition unit 288 may be provided to identify the regions where two separate panel material assemblies have been joined together, so that these regions may be removed and do not form part of a finished panel. Such a distance counting unit and/or optical weld recognition unit could also be provided in any of the other embodiments of the process/equipment described herein.

Finally, as shown in FIG. 7, the cooled elongate panel may be cut into two or more panels of desired lengths by cutting unit 242, and a packing table 244 may be provided at the downstream end of the processing path.

It should be appreciated that, similar to the embodiment described above with reference to FIG. 6, the processing equipment described with reference to FIG. 7 may be automatically controlled, for example, via a suitable controller or central control unit, such as the central control unit 240 shown in FIG. 6.

Additionally, it should be appreciated that, as an alternative to using a heated mold, the disclosed process for manufacturing linear panels may utilize any other suitable manufacturing equipment and/or technique that allows for a linear panel of desired shape and dimensions to be made using a multi-layer panel material assembly. For instance, in one or more alternative embodiments, the panel described herein may be formed by a roll-forming process. For instance, the panel material assembly may be initially heated to a given pre-heat temperature to provide the material with sufficient strength to be handled during the panel manufacturing process and to prevent undue shrinkage when the material is heated to a higher temperature during the panel-forming process. In one embodiment, the material may be pre-heated to a pre-heat temperature selected based on the specific material properties of the inner material layer of the material assembly. The edges of the panel material assembly may then be bent or rolled-formed to a desired configuration (e.g., at a bending station or any other suitable station). Thereafter, in one embodiment, heat may be applied to the panel material assembly as it is passed by rollers and, optionally, a mold, to form the remainder of the panel material assembly into the desired shape. The panel material assembly may then be cooled to set the final shape of the finished panel.

Figure 11:
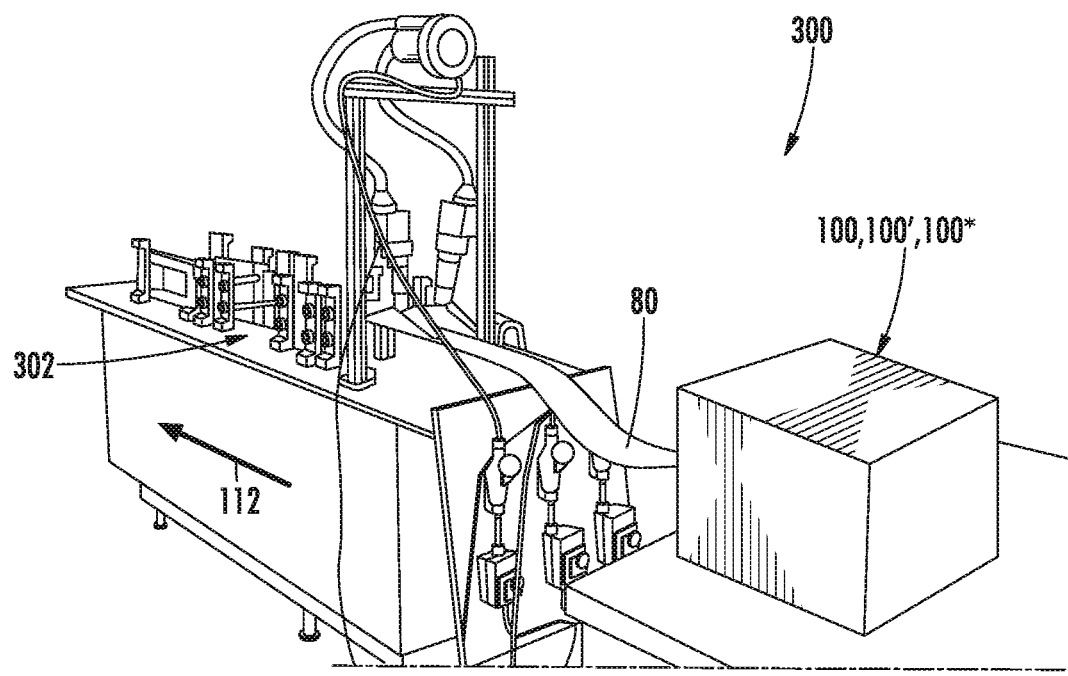
FIG. 11 illustrates a perspective view of one embodiment of a portion of manufacturing line in accordance with aspects of the present subject matter, particularly illustrating equipment for implementing an in-line process for forming a panel, with the process incorporating aspects of a process for forming a multi-layer panel material assembly used to manufacture the panel.

In one embodiment, pre-heating of the panel material assembly may be utilized to prevent or minimize material shrinkage. For instance, as indicated above, it may be desirable that any shrinkage of the material during formation of the linear panel is minimized as the dimensions of the finished panel should permit the panel to be successfully mounted onto a carrier. Additionally, in order to control the effects of any further shrinking of the panel material assembly during manufacture of the panel, the temperature to which the material assembly is heated and the speed at which the material assembly proceeds through the rollers is preferably accurately controlled during the panel manufacturing process Referring now to FIG. 11, a schematic view of one embodiment of an in-line process and related processing equipment (generally designated by 300) for manufacturing panels using a roll-forming process is illustrated in accordance with aspects of the present subject matter. In the illustrated embodiment, the process and related processing equipment for forming the multi-layer panel material assembly are indicated schematically in FIG. 11 as a solid box labeled 100, 100', 100*, with the output of such process/equipment corresponding to the panel material assembly 80 (e.g., including the inner and outer material layers). It should be appreciated that the specific process/equipment represented by box 100, 100', 100* may generally correspond to any suitable process/equipment consistent with the disclosure provided herein, such as any of the embodiments shown in FIGS. 3-5.

As shown, the previously formed multi-layer panel material assembly 80 (e.g., as represented by the elongated strip shown in FIG. 11 extending along the length of the processing path in the processing direction, as indicated by arrow 112) is configured to be drawn through corresponding roll-forming machinery 302. For instance, the roll-forming machinery 302 may be positioned downstream of the press wheels 110 (FIGS. 3-5) such that the panel material assembly 80 is drawn from its formation along the processing path in the processing direction 112. Thus, as a downstream portion of the panel material assembly 80 is being drawn through the roll-forming machinery 302 (and the remainder of any other processing equipment along the processing path), an upstream portion of the panel material assembly 80 is simultaneously being formed as part of the continuous, stream-lined process. It should be appreciated that, although the in-line process 300 will generally be described herein as corresponding to a process in which the panel material assembly 80 is drawn through a continuous sequence of processing equipment to form the desired panel, the various processing steps or operations associated with the in-line process 300 may, instead, be performed using a non-continuous or interrupted sequence of processing equipment.

Rollers (not shown), which may include small spikes, form part of the roll-forming machinery 302 and may be used to grip and pull the panel material assembly 80 through the machinery 392. As indicated above, under the influence of these pulling forces, the material may stretch, thereby affecting the thickness, stiffness, and straightness of the finished panel. It is therefore advantageous to accurately control the pulling force exerted on the panel material assembly 80 during the roll-forming process.

In one embodiment, the elongate edges of the panel material assembly 80 may be initially pre-heated to a given temperature selected based on the material properties of the inner material layer of the material assembly 80, such as a specific pre-heat temperature selected so as to permit the finished panel to retain its shape while minimizing the risk of undue shrinking and enabling the outer material layer of the material assembly 80 to retain its fibrous, felt-like appearance.

Figure 12:
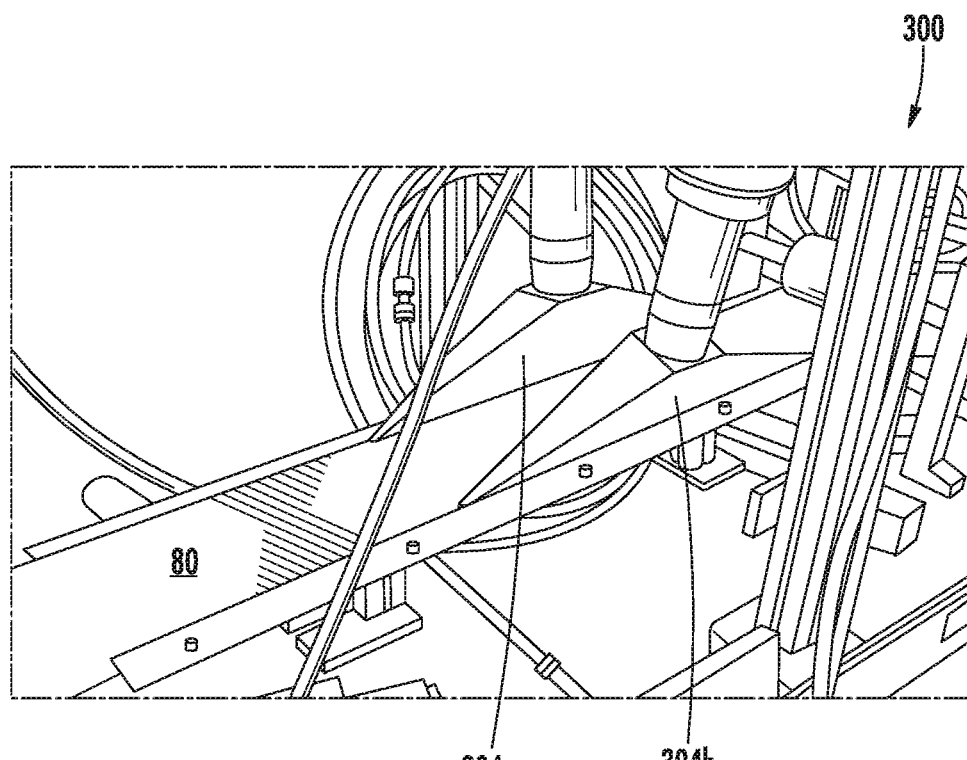
FIG. 12 illustrates a perspective view of one embodiment of a portion of a heating device that may be utilized in accordance with aspects of the present subject matter for heating panel materials.

In one embodiment, a heating device 304a, 304b, such as those depicted in FIG. 12, may touch or be provided adjacent or spaced from the edges of the panel material assembly 80 in order to heat the edges as the material assembly 80 passes the heating device 304a, 304b. The heating device 304a, 304b may blow hot air onto the edges of the panel material assembly 80 (or suck hot air through the edges of the material assembly 80), or may radiate heat in the form of infrared radiation thereon, for example. Alternatively, the heating device 304a, 304b may itself be heated and may conduct this heat to the passing material assembly 80, for example in a manner similar to an iron.

Figure 13:
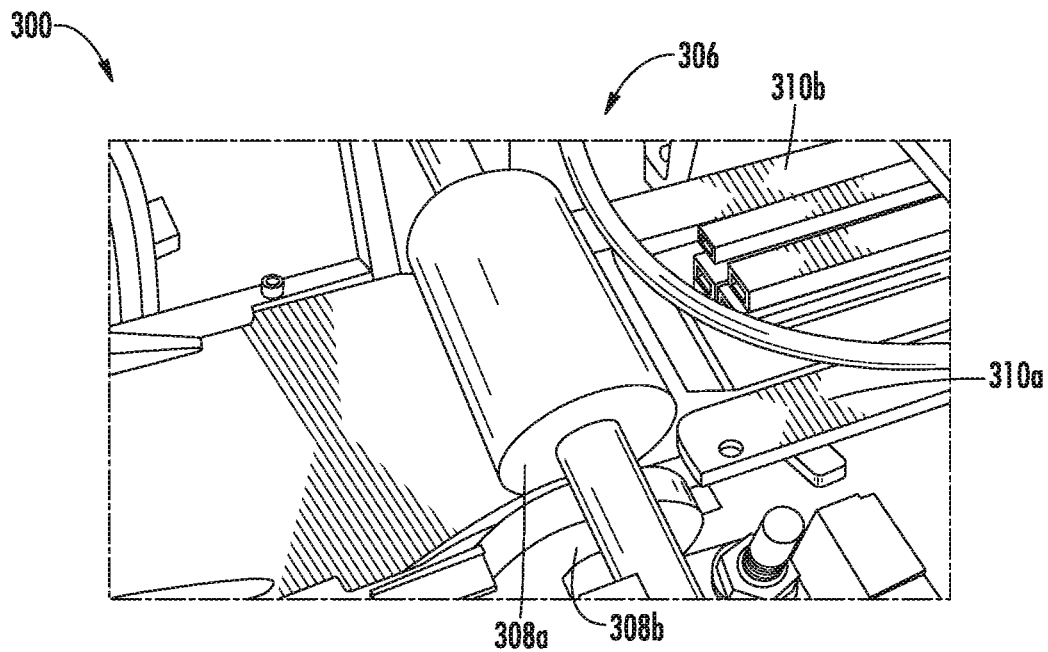
FIG. 13 illustrates a perspective view of one embodiment of a portion of a bending station that may be utilized in accordance with aspects of the present subject matter for bending the panel materials.
Figure 14:
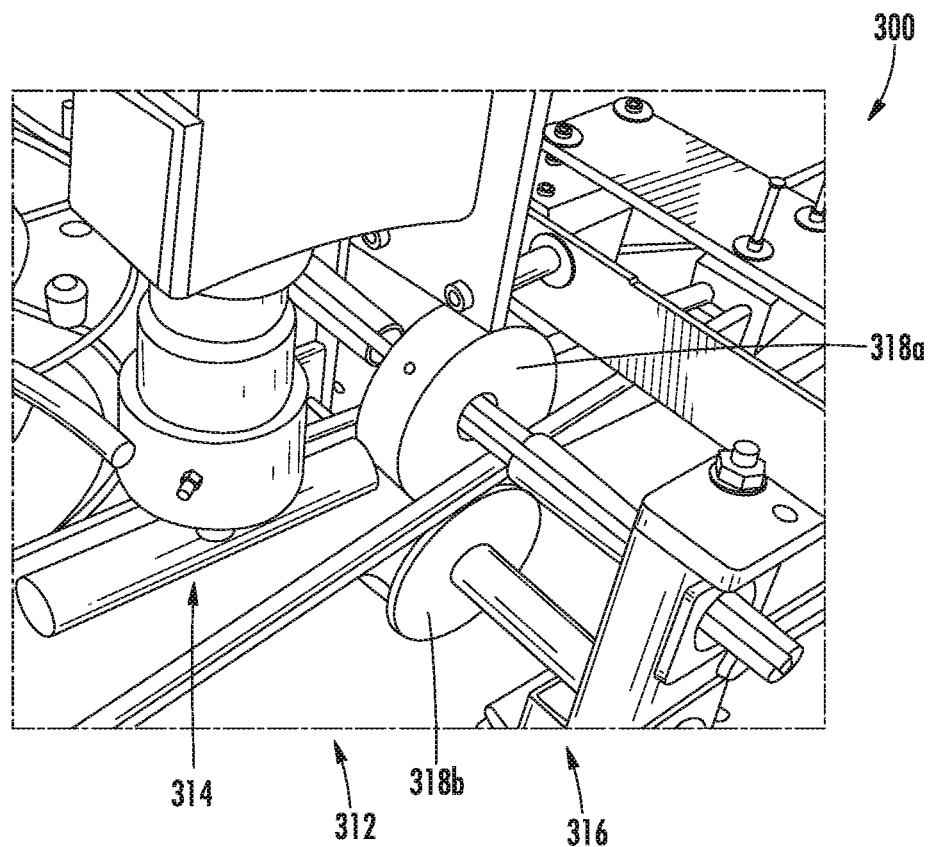
FIG. 14 illustrates a perspective view of one embodiment of a portion of a heating station that may be utilized in accordance with aspects of the present subject matter for heating panel materials.

The heated edges of the panel material assembly 80 are then directed to a bending station 306, an example of which is shown in FIG. 13, where the edges of the material assembly 80 may be bent to a desired configuration. In one embodiment, rollers 308a, 308b are used to bend the edges about approximately 90° to produce a flange across each elongate side of the panel material assembly 80. In addition, the panel material assembly 80 may then pass bending blocks 310a, 310b configured to bend the edges still further. In one embodiment, the bending blocks may be configured to further bend the edges from the angle of approximately 90° an amount greater than or equal to 20° and/or less than or equal to 70°, including any other angles defined therebetween in increments of 5°. In another embodiment, the bending blocks may be configured to further bend the edges from the angle of approximately 90° an amount greater than or equal to 35° and/or less than or equal to 55°, including any other angles defined therebetween in increments of 5°.

Where the panel is to be provided in the form of a baffle, and it is designed to hang from a carrier from one elongate side, no further bending of the panel may be necessary. However, where the panel is intended to have a substantially "U"-shaped cross-section (e.g., similar to that shown in FIGS. 1 and 2), and to hang from the carrier from both elongate sides of the panel, further bending of the panel material assembly 80 may be desirable. To achieve this, a further heating station 312, such as that shown in FIG. 14, is provided. At heating station 312, heat is provided to a roller 314 which passes over the elongate central panel wall 52 (FIG. 1) of the panel material assembly 80. The material assembly 80 then passes through a further bending station 316 which comprises two rollers 318a, 318b which cause the elongate edges of the elongate central portion to bend through approximately 90°. This provides the panel with a substantially "U"-shaped cross-section, such as that described above with references to FIGS. 1 and 2.

Following the formation of an elongated panel as described above, the elongated panel may optionally be passed through a mold 330 as depicted in FIGS. 15 and 16. FIG. 16 shows an end view of the mold 330. By passing the elongate panel through mold 330, the shape of the panel can be more accurately controlled. The mold 330 does not need to be heated, but low temperature heating of the mold may be advantageous to enable even greater control of the shrinkage of the panel material and therefore the shape of the finished panel.

Additionally, following formation of the panel, the panel material assembly is cooled. In one embodiment, the panel material assembly passes through a cooling stage where it may be cooled, for example, by chilled air or by air at ambient temperature. Active cooling, such as directing ambient or chilled air onto or through the panel material assembly 80 or passing the material assembly 80 through a cooled mold, may be employed. FIG. 17 shows one example of a cooling station or equipment for cooling the panel material assembly 80. In FIG. 17, the material is cooled via ambient air. During this cooling process, the elongated material assembly 80 is supported in a "U"-shaped channel 342. A roller 344 may be optionally provided to press and maintain the flanges of the panel (e.g., flanges 62, 64 of the panel 50 shown in FIGS. 1 and 2) in position and prevent them from springing back to their original pre-formed position when the material assembly 80 is cooled. The panel typically needs to be sufficiently cooled in order to fix the material(s) of the inner material layer of the material assembly 80 into position and thereby set the final shape of the finished panel.

Similar to the embodiment described above, the cooling process (as indeed the heating process) may be dependent upon the speed at which the material assembly 80 is fed through the cooling (or heating) stages. For example, in one embodiment, at speeds of approximately 2 meters/minute, passing the material assembly 80 through ambient air generally should be sufficient to permit satisfactory cooling of the material. However, at faster speeds of 10 to 20 meters/minute, cooled air may need to be blown directly onto or sucked through the panel material assembly 80 in order to achieve satisfactory cooling of the material assembly. Alternatively, the material assembly 80 could instead be passed through a chilled mold. It should be appreciated that, in addition to the speed at which the material assembly 80 is fed through the cooling (or heating stages), the actual length of such stage(s) may also impact the cooling (or heating) process. For instance, for a longer cooling stage, ambient air may be used for cooling at faster processing speeds than for a significantly shorter cooling stage.

Finally, once cooled, the elongate panel formed by the disclosed process may be cut into desired lengths. Depending on the desired use of the panels, the lengths will generally vary. However, in one embodiment, the panel length will generally be on the order of greater than or equal to 0.5 meters and/or less than or equal to 6 meters, including any lengths defined therebetween in increments of 0.25 meter.

It should be appreciated that, in general, the use of heated molds and roll-forming techniques have been described herein as forming part of separate processing methods. However, in alternative embodiments, a combination of roll-forming techniques and heated molds may be used in the manufacture of the linear panels.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

The invention claimed is:

1. A method of forming a linear panel, the method comprising:
   drawing a multi-layer panel material assembly along a processing path, the panel material assembly comprising an inner material layer and an outer material layer, the inner material layer differing from the outer material layer;
   heating the panel material assembly to a processing temperature as the panel material assembly is drawn along the processing path, the processing temperature being greater than a forming temperature of the inner material layer and less than a forming temperature of the outer material layer;
   forming the heated panel material assembly into a panel body having a desired panel shape, the panel body including a panel wall and first and second sidewalls extending outwardly from the panel wall, first sides of each of the panel wall, first sidewall, and second sidewall defining an inner surface of the panel body and opposed second sides of each of the panel wall, first sidewall and second sidewall defining an outer surface of the panel body; and
   cooling the panel material assembly after it has been formed into the desired panel shape and as the panel material assembly is drawn along the processing path;
   wherein:
   the inner material layer extends along the first sides of each of the panel wall, first sidewall, and second sidewall and forms the inner surface of the panel body; and
   the outer material layer extends along the opposed second sides of each of the panel wall, first sidewall, and second sidewall and forms the outer surface of the panel body.

2. The method of claim 1, further comprising forming the panel material assembly as part of an in-line process while a downstream portion of the panel material assembly is being drawn along the processing path.

3. The method of claim 2, wherein forming the panel material assembly comprises coupling an inner strip of material to an outer strip of material to form the inner and outer material layers, respectively, of the panel material assembly.

4. The method of claim 3, further comprising heating the inner strip of material to facilitate adherence of the inner strip of material to the outer strip of material.

5. The method of claim 4, wherein the inner strip of material is heated to a temperature that is equal to or greater than a melting temperature of a material forming the inner strip of material.

6. The method of claim 3, wherein forming the panel material assembly further comprises pressing the inner and outer strips of material together to facilitate adherence of the inner strip of material to the outer strip of material.

7. The method of claim 3, wherein:
   the panel material assembly further comprises an intermediate layer disposed between the inner material layer and the outer material layer; and
   forming the panel material assembly further comprises heating the intermediate layer to facilitate adherence of the inner strip of material to the outer strip of material.

8. The method of claim 1, wherein the outer material layer is formed from a fibrous felt material.

9. The method of claim 1, wherein the inner material layer is formed from a thermoformable fibrous material or a thermoformable film material.

10. The method of claim 1, wherein a thickness ratio of a thickness of the inner material layer to a thickness of the outer material layer ranges from greater than 1:1 to less than 4:1.

11. A method of forming a linear panel, the method comprising:
- coupling separate strips of material together to form a layered material assembly including an inner material layer and an outer material layer as a downstream portion of the layered material assembly is being drawn along a processing path, the inner material layer differing from the outer material layer;
- heating the layered material assembly to a processing temperature as the layered material assembly is drawn along the processing path, the processing temperature being greater than a forming temperature of the inner material layer and less than a forming temperature of the outer material layer; and
- forming the heated layered material assembly into a panel body having a desired panel shape, the panel body including a panel wall and first and second sidewalls extending outwardly from the panel wall, first sides of each of the panel wall, first sidewall, and second sidewall defining an inner surface of the panel body and opposed second sides of each of the panel wall, first sidewall and second sidewall defining an outer surface of the panel body;

wherein:
- the inner material layer extends along the first sides of each of the panel wall, first sidewall, and second sidewall and forms the inner surface of the panel body; and
- the outer material layer extends along the opposed second sides of each of the panel wall, first sidewall, and second sidewall and forms the outer surface of the panel body.

12. The method of claim 11, wherein coupling separate strips of material together to form the layered material comprises coupling an inner strip of material to an outer strip of material to form the inner and outer material layers, respectively, of the panel material assembly.

13. The method of claim 12, further comprising heating the inner strip of material to facilitate adherence of the inner strip of material to the outer strip of material.

14. The method of claim 13, wherein the inner strip of material is heated to a temperature equal to or greater than a melting temperature of a material forming the inner strip of material.

15. The method of claim 12, wherein forming the panel material assembly further comprises pressing the inner and outer strips of material together to facilitate adherence of the inner strip of material to the outer strip of material.

16. The method of claim 11, wherein the outer material layer is formed from a fibrous felt material.

17. The method of claim 11, wherein the inner material layer is formed from a thermoformable fibrous material or a thermoformable film material.

* * * * *